(12) United States Patent
Kamal et al.

(10) Patent No.: US 10,657,728 B2
(45) Date of Patent: May 19, 2020

(54) AUGMENTED REALITY PROJECTION DEVICES, METHODS, AND SYSTEMS

(71) Applicant: Verizon Patent and Licensing Inc., Arlington, VA (US)

(72) Inventors: Syed Meeran Kamal, South Plainfield, NJ (US); Jonathan A. Globerson, Aventura, FL (US); Adwait Ashish Murudkar, Highland Park, NJ (US); Lama Hewage Ravi Prathapa Chandrasiri, Franklin Park, NJ (US); Sergey Virodov, Fair Lawn, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/396,043

(22) Filed: Apr. 26, 2019

(65) Prior Publication Data
US 2019/0259212 A1 Aug. 22, 2019

Related U.S. Application Data

(63) Continuation of application No. 15/859,161, filed on Dec. 29, 2017, now Pat. No. 10,339,718.

(51) Int. Cl.
*G06T 19/00* (2011.01)
*H04N 9/31* (2006.01)
*G06T 7/70* (2017.01)

(52) U.S. Cl.
CPC .............. *G06T 19/006* (2013.01); *G06T 7/70* (2017.01); *H04N 9/3185* (2013.01); *H04N 9/3194* (2013.01); *G06T 2207/10016* (2013.01)

(58) Field of Classification Search
None
See application file for complete search history.

(56) References Cited

U.S. PATENT DOCUMENTS

| | | | |
|---|---|---|---|
| 9,552,657 B2 * | 1/2017 | Ueno | H04M 1/0272 |
| 10,304,249 B2 * | 5/2019 | Cronin | G06T 19/006 |
| 2006/0146015 A1 | 7/2006 | Buchmann | |
| 2009/0207322 A1 | 8/2009 | Mizuuchi et al. | |
| 2009/0244097 A1 * | 10/2009 | Estevez | G06F 1/1613 345/633 |
| 2012/0075534 A1 | 3/2012 | Katz et al. | |
| 2012/0194517 A1 * | 8/2012 | Izadi | G06T 17/00 345/420 |

(Continued)

*Primary Examiner* — Ryan M Gray

(57) ABSTRACT

An augmented reality projection device includes an image sensor having a field of view into a real-world environment, a spatial sensor configured to detect a location and an orientation of the device in the environment, and a projector configured to project content onto a physical surface within the environment. The device determines the location and orientation of the device based on sensor output from the spatial sensor, and determines that a virtual target object is included within the field of view of the image sensor based on the determined location and orientation and based on a particular target object profile from a library of predetermined target object profiles. The device identifies content associated with the virtual target object and directs the projector to project the content onto the physical surface within the environment, the physical surface associated with the virtual target object. Corresponding methods and systems are also disclosed.

20 Claims, 12 Drawing Sheets

(56) References Cited

U.S. PATENT DOCUMENTS

| | | |
|---|---|---|
| 2013/0265502 A1 | 10/2013 | Huebner |
| 2015/0179147 A1* | 6/2015 | Rezaiifar ............ G03B 21/142 345/625 |
| 2015/0332507 A1 | 11/2015 | Monaghan et al. |
| 2017/0330495 A1 | 11/2017 | Doi et al. |
| 2018/0150148 A1 | 5/2018 | Yeung et al. |

* cited by examiner

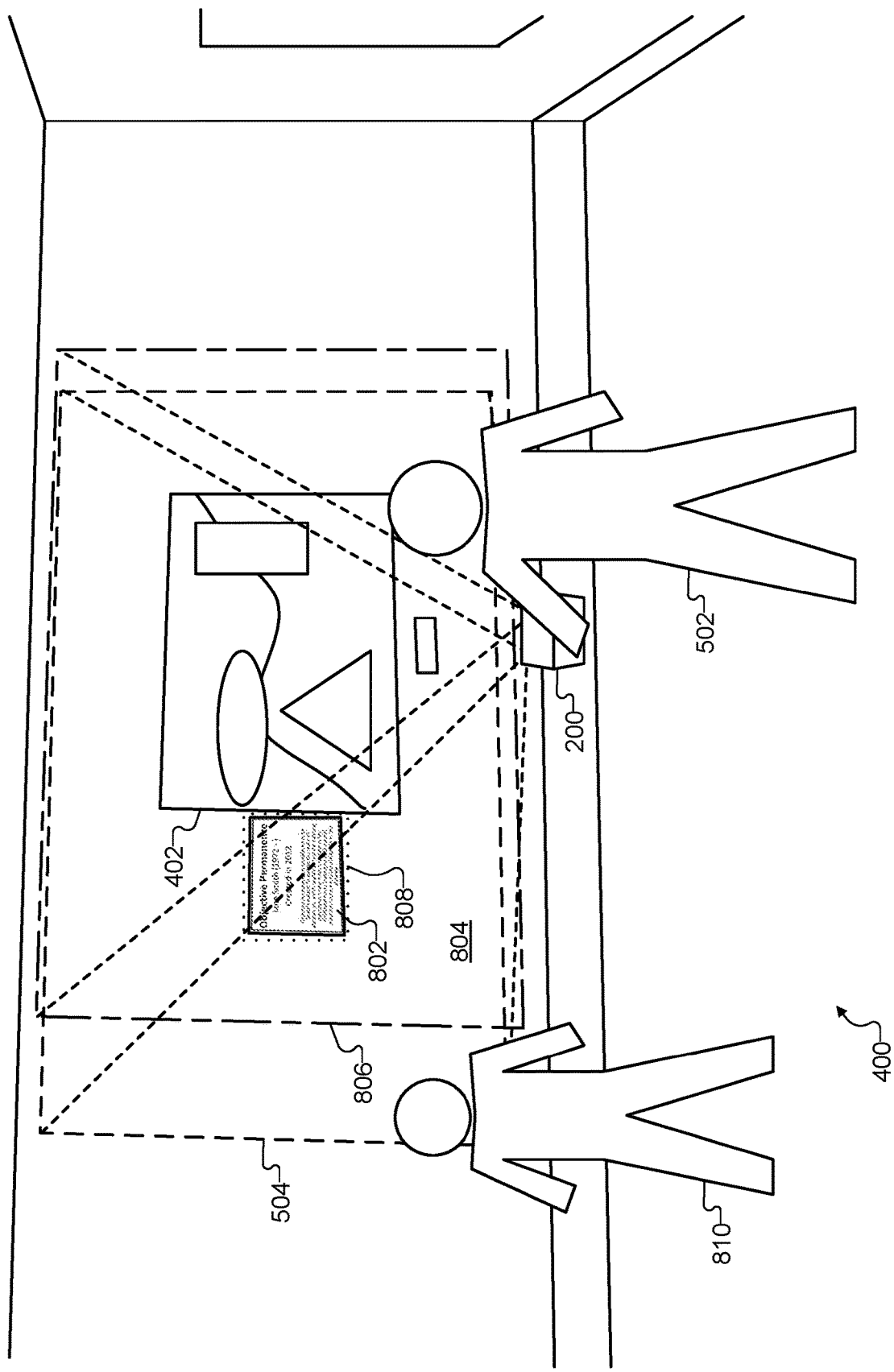

AUGMENTED REALITY PROJECTION DEVICES, METHODS, AND SYSTEMS

RELATED APPLICATIONS

This application is a continuation application of U.S. patent application Ser. No. 15/859,161, filed Dec. 29, 2017, and entitled "Methods and Systems for Projecting Augmented Reality Content," which is hereby incorporated by reference in its entirety.

BACKGROUND INFORMATION

Users of augmented reality player devices (e.g., augmented reality glasses, mobile devices running augmented reality applications, etc.) may experience an augmented version of the real-world environment around them. For example, an augmented reality player device may present augmented reality content to a user on a display associated with the augmented reality player device (e.g., on a heads-up display projected onto partially-transparent augmented reality glasses worn by the user, on a screen of a mobile device held by the user, etc.). For instance, the augmented reality content may be overlaid, within the display, on the user's view of the real-world environment around him or her. In this way, the user may not only experience (e.g., see, hear, and/or otherwise perceive or interact with) the real-world environment, but may further experience various augmentations to the real-world environment such as objects, characters, information, and the like that are not actually present in the real-world environment.

While such augmented reality experiences may be beneficial to a user possessing a personal augmented reality player device configured to present the overlaid augmented reality content on a device display, such augmentations are not visible in the real-world environment without the device display. As such, the user may only experience the augmented reality content by way of display equipment (e.g., glasses, display screens, etc.) associated with the personal augmented reality device.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 8 illustrates an exemplary content projection operation being performed by the integrated implementation of the augmented reality presentation system and the augmented reality projection device of FIG. 2 according to principles described herein.

DETAILED DESCRIPTION OF PREFERRED EMBODIMENTS

Figure 1:
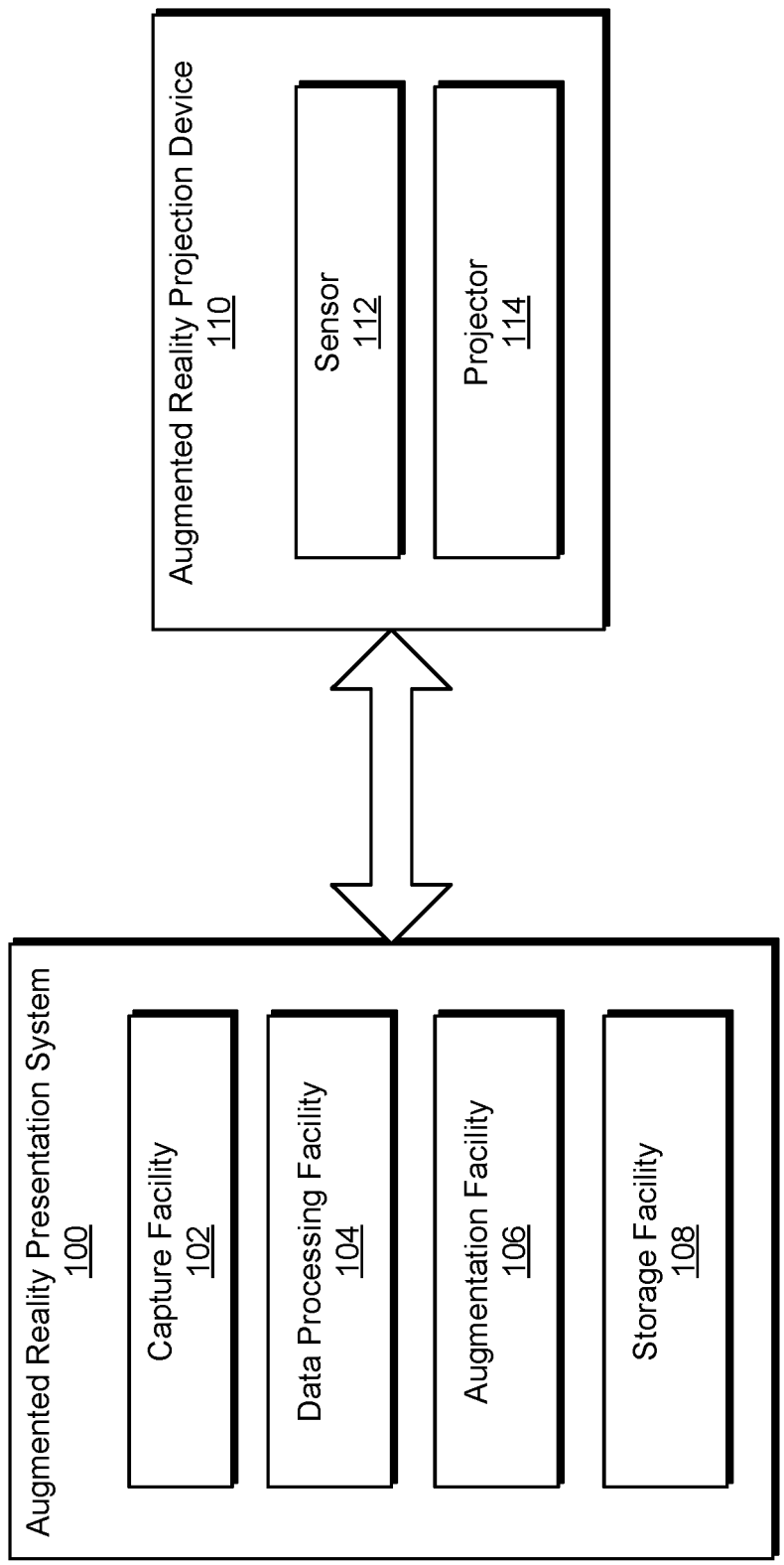
FIG. 1 illustrates an exemplary augmented reality presentation system associated with an exemplary augmented reality projection device for projecting augmented reality content into a real-world environment according to principles described herein.

Methods and systems for projecting augmented reality content into a real-world environment are described herein. For example, in certain implementations, an augmented reality presentation system may direct a sensor included within an augmented reality projection device to capture an image of a portion of a real-world environment. Specifically, the portion of the real-world environment captured by the sensor may be a portion that is included within a field of view of the sensor. In various examples described herein, the sensor included within the augmented reality projection device may be implemented by a camera configured to capture an image implemented by a video feed. As such, the field of view of the camera may refer to a portion of the real-world environment that is captured by the camera (e.g., based on lenses within the camera, the resolution of the camera, etc.). While the following example, and various other examples illustrated and described herein may refer to cameras that capture video feeds, however, it will be understood that other types of sensors configured to capture other types of images using other types of fields of view may also be used in accordance with principles described herein. For instance, a sensor may be implemented as a depth sensor (e.g., a LIDAR scanner, etc.) that detects and tracks images such as point clouds representative of depth points of objects being scanned, as a scanner that uses one or more lasers to detect information encoded in images (e.g., visual patterns) such as barcodes or QR codes, and/or as any other type of camera, scanner, or other sensor as may serve to capture any type of image in a particular implementation. In any of these examples, a field of view of the sensors may refer to a portion of the real-world environment that is within the scannable range of the depth sensor, scanner, or other suitable sensor.

As a camera (i.e., the sensor) captures a video feed (i.e., the image), the augmented reality presentation system may determine that a target object (e.g., a target object located within the real-world environment) is included within the field of view of the camera, and may identify augmented reality content associated with the target object. As the camera continues capturing the video feed, the augmented reality presentation system may direct a projector included within the augmented reality projection device to project the identified augmented reality content onto a physical surface within the real-world environment. For example, the physical surface may be a surface associated with the target object (e.g., a wall, a floor, a door, an object surface, etc.) and physically detached from the augmented reality projection device. In some examples, the physical surface may be included within the field of view of the camera while the augmented reality content is projected onto the physical surface.

As will be described in more detail below, in certain examples, an augmented reality projection device may be separate from, but communicatively coupled with, an augmented reality presentation system that performs the operations described above with respect to components (e.g., a camera component, a projector component, etc.) of the augmented reality projection device. For instance, an augmented reality presentation system may be implemented by a computing system communicatively coupled to an augmented reality projection device by way of one or more networks (e.g., including wireless networks). In other examples, an augmented reality projection device may include an augmented reality presentation system integrated within a single enclosure of the augmented reality projection device that also contains the camera, the projector, and other components of the augmented reality projection device.

Accordingly, in some exemplary implementations, a camera included within an augmented reality projection device may capture a video feed of a portion of a real-world environment, where the portion of the real-world environment is a portion included within a field of view of the camera. The augmented reality projection device may determine, as the camera captures the video feed, that a target object (e.g., a target object that is located within the real-world environment) is included within the field of view of the camera. The augmented reality projection device may identify augmented reality content associated with the target object. Then, as the camera continues capturing the video feed, a projector (e.g., a projector statically mounted alongside the camera within the augmented reality projection device) may project the augmented reality content onto a physical surface within the real-world environment. As with the implementations described above, the physical surface onto which the augmented reality content is projected may be associated with the target object (e.g., part of the target object, adjacent to the target object, etc.) and may be physically detached (i.e., separate) from the augmented reality projection device. Moreover, the physical surface onto which the augmented reality content is projected may be included within the field of view of the camera while the augmented reality content is projected onto the physical surface.

In some examples, the augmented reality projection device (e.g., based on direction from an integrated or a separate augmented reality presentation system) may dynamically stabilize a projection of the augmented reality content at a particular portion of the physical surface in response to a change to at least one of a position and an orientation of the augmented reality projection device with respect to the particular portion of the physical surface. Specifically, the augmented reality projection device may dynamically stabilize the projection in real time as the position and/or orientation of the augmented reality projection device (e.g., including the projector within the augmented reality projection device) is moved about with respect to the physical surface. For example, the augmented reality projection device may be implemented as a handheld device that a user holds and points at different portions of the real-world environment in a similar way as one might hold and point a flashlight in a darkened room. However, whereas an ordinary flashlight uses light to reveal obscured details of real-world objects under the beam of the flashlight, the augmented reality projection device may use a camera and a projector to "reveal" (i.e., project) augmentations to the real-world environment associated with particular real-world objects and/or locations.

Just as most real-world objects would remain static as a flashlight beam moves across them (or at least move independently from the flashlight beam), it may be desirable for augmented reality content projected by the augmented reality projection device (e.g., augmented reality content associated with target objects that have been recognized and identified) to likewise be dynamically stabilized so as to remain statically anchored in one place in spite of how a user may move the augmented reality projection device. By being dynamically stabilized in this way, even as the projector is pointed in different directions and/or moved about within the real-world environment, it may seem to the user that the augmentations are similar to real-world objects within the real-world environment, except that the augmentations may only be experienced (e.g., seen, heard, or otherwise perceived) using the flashlight-like functionality of the augmented reality projection device.

Accordingly, "stabilized" augmented reality content may refer to augmented reality content that is projected into a real-world environment so as to have a particular location, size, orientation, etc., that is independent of the location, field of view, orientation, etc. of the projector projecting the augmented reality content. Accordingly, stabilized augmented reality content may be projected onto a physical projection surface by a projector that is detached from the projection surface and is free to move in any way with respect to the projection surface. However, the stabilized augmented reality content may appear to be statically located, sized, oriented, etc., with respect to the projection surface, rather than with respect to the projector, as would be the case with an ordinary static projection of content.

In some examples, the stabilization of augmented reality content may be performed dynamically (e.g., continuously, based on up-to-date information) and in real time. As used herein, operations may be performed in "real time" when performed immediately and without undue delay. As such, while dynamic stabilization may not occur instantaneously (i.e., augmented reality content may not remain perfectly static and/or stabilized as an augmented reality projection device is moved), moment-by-moment stabilization corrections may be performed as the projector and/or the physical projection surface move with respect to one another, and augmented reality content may be readjusted to a desirable size, location, orientation, etc., as quickly as possible (e.g., within milliseconds or seconds of the detected changes).

Method and systems described herein for projecting augmented reality content into a real-world environment may provide various benefits, particularly when the augmented reality content projected is stabilized, as described above. For example, while users conventionally have had to view a special display associated with an augmented reality player device in order to benefit from augmentations to the real-world environment, methods and systems described herein allow users to experience and share augmented reality without a need for the special displays. As a result, users of augmented reality projection devices may avoid discomfort, inconvenience, stigma, cost, and so forth that may be associated with immersive augmented reality displays such as augmented reality headsets, augmented reality glasses, and the like. At the same time, the users may still be immersed in an augmented reality world where augmented reality content is displayed in association with real-world objects that the content corresponds to, rather than having to view the augmented reality world in a less immersive way such as by experiencing the world through a screen of an augmented reality media player (e.g., a smartphone device, a tablet device, etc.) held at arm's length.

Additionally, because augmented reality content is actually projected onto physical surfaces within the real-world environment, the augmented reality content may benefit (e.g., inform, entertain, be perceived by, etc.) not only the user of the augmented reality projection device, but also other people in the real-world environment with the user. For instance, in an example where augmented reality content is associated with exhibits at a museum and is configured to reveal additional information (e.g., written text, videos, etc.) about each exhibit, conventional augmented reality technology may require each museum patron to have his or her own augmented reality player device to experience the augmented reality content. In contrast, a single augmented reality projection device described herein, if used by just one person in a group of people touring the museum together, would allow everyone in the group to experience the augmented reality content simultaneously.

Various embodiments will now be described in more detail with reference to the figures. The disclosed systems and methods may provide one or more of the benefits mentioned above and/or various additional and/or alternative benefits that will be made apparent herein.

FIG. 1 illustrates an exemplary augmented reality presentation system associated with an exemplary augmented reality projection device for projecting augmented reality content into a real-world environment. Specifically, FIG. 1 shows an augmented reality presentation system 100 ("system 100") that includes, without limitation, a capture facility 102, a data processing facility 104, an augmentation facility 106, and a storage facility 108 selectively and communicatively coupled to one another. FIG. 1 further shows an augmented reality projection device 110 ("device 110") associated with system 100 and that includes, without limitation, a sensor 112 and a projector 114.

It will be recognized that although facilities 102 through 108 are shown to be separate facilities in FIG. 1, facilities 102 through 108 may be combined into fewer facilities, such as into a single facility, or divided into more facilities as may serve a particular implementation. Each of facilities 102 through 108 may be distributed between multiple devices and/or multiple locations as may serve a particular implementation. Additionally, one or more of facilities 102 through 108 may be omitted from system 100 in certain implementations, while additional facilities may be included within system 100 in the same or other implementations.

Additionally, it will be understood that although system 100 and device 110 are depicted as separate entities associated with one another by way of an arrow, the association between system 100 and device 110 may represent any relationship including a complete integration with one another. For instance, in some examples, system 100 may be separate from and communicatively coupled with device 110 (i.e., such that the arrow represents any suitable communication interface between system 100 and device 110 such as a network-based communication interface). In other examples, system 100 may be integrated with (e.g., included within) device 110 and/or may include or integrate device 110 (i.e., such that the arrow represents an integration of system 100 and device 110 into a single unit). In the same or other examples, facilities 102 through 108 of system 100 may be distributed across multiple systems and/or devices such as by being partially implemented in one or more computing devices implementing system 100 and partially implemented within sensor 112, projector 114, and/or other components of device 110. Each of the components of system 100 and device 110 will now be described in more detail.

Capture facility 102 may include any hardware and/or software (e.g., image sensors or scanners associated with or included within sensor 112, network interfaces, computing devices, software running on or implementing such devices or interfaces, etc.) that may be configured to perform image capture operations for projecting augmented reality content into a real-world environment as described herein. For example, capture facility 102 may direct sensor 112 within device 110 to capture an image (e.g., a video feed, a still image, a barcode, etc.) of a portion of a real-world environment (e.g., a portion of the real-world environment that is included within a field of view of sensor 112). If device 110 is separate from system 100, capture facility 102 may perform the directing of sensor 112 to capture the image by transmitting instructions to this effect over a communication interface (e.g., over a network or the like) to device 110 to be performed by sensor 112. If, however, device 110 is integrated with system 100, capture facility 102 may be integrated within sensor 112 as a hardware or software controller for one or more image sensors included within sensor 112. In this type of implementation, capture facility 102 may thus direct sensor 112 to capture the image by direct control of sensor 112 as will be illustrated and described below.

Data processing facility 104 may include one or more physical computing devices (e.g., the same hardware and/or software components included within capture facility 102 and/or components separate from those of capture facility 102) that perform various data processing operations for projecting augmented reality content into the real-world environment. For example, data processing facility 104 may perform an operation to determine (e.g., based on the image as the camera captures the image) that a target object located within the real-world environment is included within the field of view of sensor 112. For instance, such a determination may be made based on object recognition of a physical target object visible within images of the image, based on a detected location and orientation of sensor 112 (e.g., to determine that a non-visible virtual target object is within the field of view of sensor 112), and/or in any other manner and based on any other data as may serve a particular implementation. As another example of a data processing operation, data processing facility 104 may identify augmented reality content associated with the target object. For example, augmented reality content may be identified to be associated with a detected target object in a target object profile in a library of predetermined target object profiles, identified by searching for relevant augmented reality content by way of a database or Internet search or the like, or otherwise identified (e.g., found, accessed, downloaded, generated, discovered, etc.) in any manner as may serve a particular implementation.

Like facilities 102 and 104, augmentation facility 106 may include one or more physical computing devices (e.g., the same hardware and/or software components included within facilities 102 and/or 104 or components separate from those of facilities 102 and/or 104) that perform various augmentation operations for projecting the augmented reality content identified by data processing facility 104 into the real-world environment. For example, augmentation facility 106 may perform an operation to direct (e.g., based on the image as sensor 112 continues capturing the image) projector 114 within device 110 to project the identified augmented reality content onto a physical surface within the real-world environment and associated with the target object. The physical surface may be physically detached from device 110 and/or system 100 and may be included within the field of view of sensor 112 while the identified augmented reality content is projected onto the physical surface. If device 110 is separate from system 100, augmentation facility 106 may perform the directing of projector 114 to project the augmented reality content by transmitting instructions to this effect over a communication interface (e.g., over a network or the like) to device 110 to be performed by projector 114. If, however, device 110 is integrated with system 100, augmentation facility 106 may be integrated within projector 114 as a hardware or software controller for one or more projection components included within projector 114. In this type of implementation, augmentation facility 106 may thus direct projector 114 to project the augmented reality content onto the physical surface by direct control of projector 114, as will be illustrated and described below.

Storage facility 108 may include image data (e.g., image data (e.g., video data), augmented reality content data, etc.) and/or any other data received, generated, managed, maintained, used, and/or transmitted by facilities 102 through 106. In some examples, storage facility 108 may include data used to facilitate operations of facilities 102 through 106 such as buffering spaces for storing image data, program code, variables, intermediate content used in the preparation and/or generation of augmented reality content, and/or any other signals or data used to implement methods and systems described herein as may serve a particular implementation.

Within device 110, sensor 112 may include one or more image sensors (e.g., CMOS image sensors, CCD image sensors, etc.), image scanners (e.g., lasers for scanning barcodes or the like, etc.), as well as hardware (e.g., logic, microcontrollers, etc.) and/or software for controlling the image sensors and/or scanners to capture, store, and transmit images such as an ongoing video image to be provided by sensor 112 in an image. Exemplary image sensors and control modules implementing sensor 112 will be described below for an example in which sensor 112 is implemented as a camera configured to capture a video feed. However, as described above, it will be understood that in other examples sensor 112 may be implemented as an image scanner, a camera configured to capture only still frame photos, or any other type of sensor as may serve a particular implementation.

Projector 114 may include one or more projection components (e.g., LCD light gates, digital micromirror devices, light sources such as arrays of LEDs, etc.), as well as hardware and/or software for controlling the projection components to receive, prepare, and project images of augmented reality content into a real-world environment (e.g., onto a physical surface within the real-world environment). Exemplary projector components and control modules implementing projector 114 will be described below.

Figure 2:
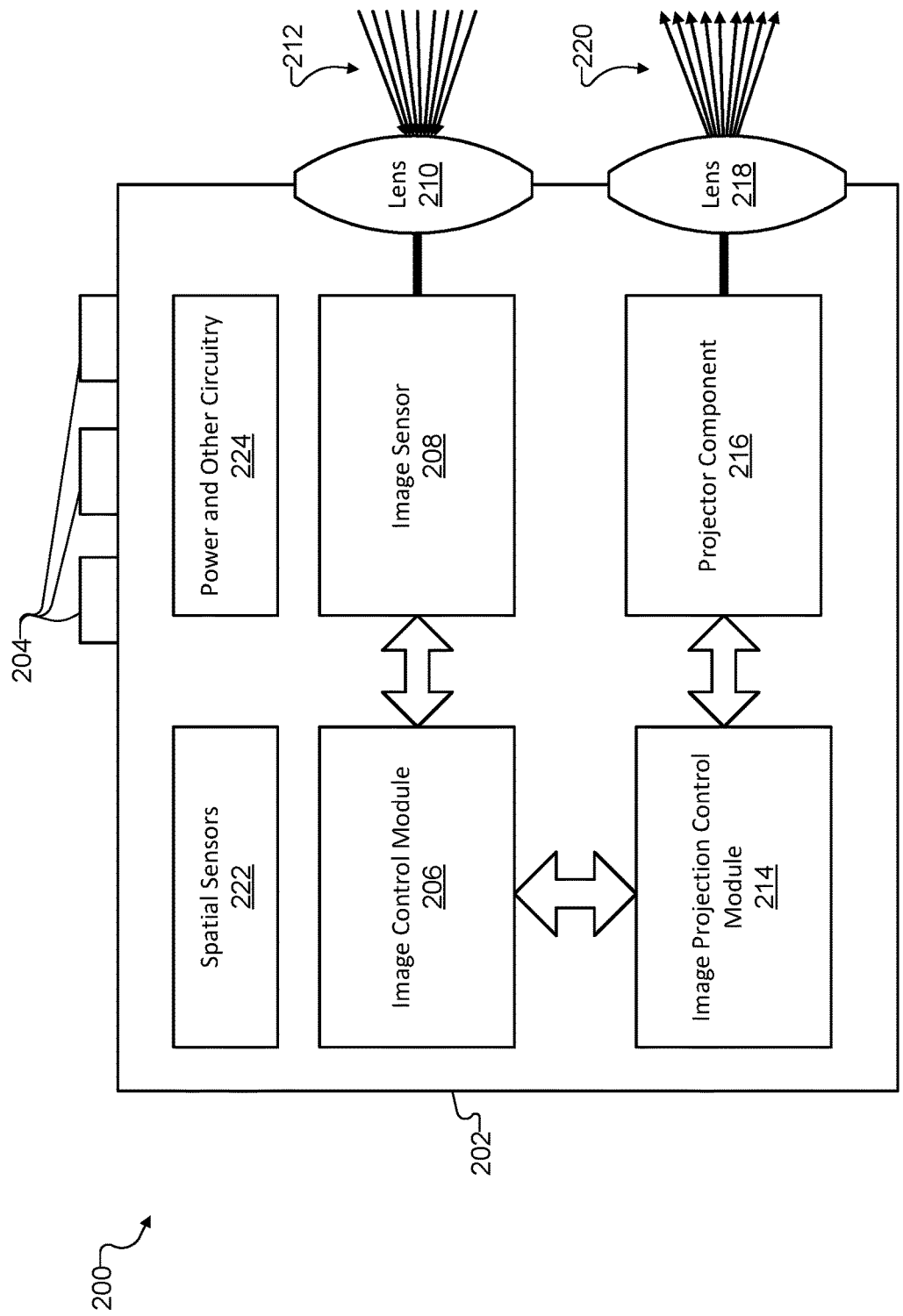
FIG. 2 illustrates an exemplary integrated implementation of the augmented reality presentation system and the augmented reality projection device of FIG. 1 according to principles described herein.

FIG. 2 illustrates an exemplary integrated implementation of system 100 and device 110. More particularly, an augmented reality projection device 200 ("device 200") shown in FIG. 2 may implement both system 100 and device 110 as they were described above. To this end, as shown, device 200 includes a plurality of components incorporated within an enclosure 202 that includes one or more buttons 204 or other such user interface elements external to enclosure 202 to allow a user of device 200 to use and control the device as the user may desire in accordance with functionality described herein. In some examples, enclosure 202, within which device 200 is implemented, may be a personal device (e.g., a device that is relatively small, battery-powered, self-contained, etc., and that may be carried by hand, worn on the person of the user such as strapped to the head or the arm, etc.). As such, device 200 may be conveniently operated by an individual user in an analogous manner as the user might use a flashlight, headlamp, or the like. While device 200 is depicted and will be described as an integrated implementation of system 100 and device 110, it will be understood that a non-integrated implementation of device 110 may include the same or similar components as illustrated within device 200, but may further include components for communicating with a separate system 100 that may exchange data with, and provide direction to, the implementation of the non-integrated augmented reality projection device.

As shown, various components may be incorporated within enclosure 202 of device 200. For example, an image control module 206 may be communicatively coupled with an image sensor 208, which may use a lens 210 to capture light representative of an image 212 of a real-world environment in which device 200 is located. Collectively, image control module 206, image sensor 208, and lens 210 may, along with other suitable components, implement a camera (e.g., a camera implementing sensor 112, described above). As shown, in some examples, both the camera and the projector may be included together (e.g., statically mounted alongside one another) within a single enclosure such as enclosure 202. In other examples, however, it will be understood that a distributed configuration, in which all of the components of device 200 are not enclosed in an integrated enclosure, may be employed. For instance, the camera of device 200 may be implemented as a camera included in a mobile device (e.g., a smart phone) while the projector of device 200 may be implemented as a separate device in an enclosure separate from the mobile device.

Alongside these components implementing the camera, several components that collectively implement a projector such as projector 114, described above, may be mounted (e.g., statically mounted) within enclosure 202. Specifically, as shown, the projector may be implemented by an image projection control module 214 communicatively coupled with a projector component 216, which may use a lens 218 to project light of a projection 220 onto a physical surface within the real-world environment in which device 200 is located.

Image control module 206 may be configured to direct image sensor 208 and lens 210 to capture the light representative of image 212. To this end, control module 206 may be associated with logic (e.g., one or more microcontrollers or other processors), memory, non-transitory storage, communication interfaces, and so forth to control image sensor 208 and lens 210, as well as to perform certain data processing operations with respect to image data (e.g., a video feed) captured by image sensor 208. For example, image control module 206 may at least partially implement data processing facility 104 described above and, as such, may determine that a target object is included within a field of view of the camera (e.g., is represented within the image received from image sensor 208), may identify augmented reality content associated with the target object, and so forth.

Image sensor 208 may capture the video feed by sensing (e.g., detecting, capturing, etc.), under direction of image control module 206, light coming in through lens 210. For example, image sensor 208 may be implemented by a CMOS image sensor, a CCD image sensor, or another image sensor employing another suitable digital or analog image sensing technology.

For reasons that will be made apparent, a dynamic range of device 200 may be influenced or determined by various characteristics associated with a field of view of a camera included within device 200. For example, characteristics such as a resolution of image sensor 208, a magnification power of lens 210, and/or other optical or electrical characteristics of the camera may serve as determining factors for the dynamic range of device 200 (e.g., how well device 200 can function at different locations, orientations, etc., with respect to target objects and/or projection surfaces in the real-world environment).

As a result, it may be desirable to employ different image sensors 208 and/or different lenses 210 to implement different characteristics (e.g., different resolutions, different magnification powers, different image sensing technologies, etc.) at different times. For example, when device 200 is detected to be relatively close to a target object in the real-world environment (e.g., such that the target object fills up a relatively large amount of the available resolution of one image sensor 208), it may be desirable to use a different lens 210 (e.g., a wider angle lens) and/or a different image sensor 208 than when device 200 is detected to be relatively remote to the target object (e.g., such that the target object fills up a relatively small amount of the available resolution of the image sensor 208). To this end, as certain implementations of image control module 206 direct image sensor 208 to capture light of image 212, the image capture may include selecting a sensor parameter associated with the field of view of the camera. For example, the sensor parameter may designate a particular image sensor 208 from a plurality of different image sensors (e.g., each having different characteristics such as different resolutions) included within the camera. As another example, the sensor parameter may designate a particular lens 210 from a plurality of different lenses (e.g., each providing a different magnification power such as a wide-angle magnification power or a narrow-angle magnification power for the field of view) included within the camera.

Additionally, or as an alternative to including pluralities of different image sensors and/or different lenses, the configuration of image sensor 208 with respect to lens 210 (e.g., or an adjustable set of lenses collectively implementing lens 210) may also be altered to achieve some of the differences in characteristics described above. For example, the camera may achieve different characteristics by mechanically and/or electrically reconfiguring (e.g., sliding, repositioning, etc.) image sensor 208, lens 210, or components associated therewith (e.g., mirrors, fixtures having different lenses that may be electrically or mechanically activated, etc.). Thus, another exemplary sensor parameter that may be selected by device 200 (e.g., by image control module 206) may designate a particular optical configuration from a plurality of different optical configurations (e.g., each providing a different configuration of image sensor 208 and/or lens 210) supported by the camera.

Just as with the camera of device 200, and for similar reasons that will be made apparent, a dynamic range of device 200 may also be highly influenced or determined by various characteristics associated with a field of view of a projector included within device 200. For example, characteristics such as a resolution of projector component 216, a magnification power of lens 218, and/or other optical or electrical characteristics of the projector may serve as determining factors for the dynamic range of device 200.

As a result, it may be desirable to employ different projector components 216 and/or different lenses 218 to implement different characteristics (e.g., different resolutions, different magnification powers, different projection technologies, etc.) at different times. For example, when device 200 is detected to be relatively close to a physical surface onto which augmented reality content is to be projected in the real-world environment (e.g., such that the augmented reality content to be projected fills up a relatively large amount of the available resolution of projector component 216), it may be more desirable to use a different lens 218 and/or one or more different projector components 216 than when device 200 is detected to be relatively remote to the physical surface (e.g., such that the augmented reality content fills up a relatively small amount of the available resolution of the projector component 216). To this end, as certain implementations of image projection control module 214 direct projector component 216 to project projection 220, the content projection may include selecting a projection parameter associated with a field of view of the projector. For example, as with the capture parameter described above, the projection parameter may designate a particular lens from a plurality of different lenses included within the projector.

Additionally, or as an alternative to including projector components and/or different lenses, the configuration of projector component 216 with respect to lens 218 (e.g., or an adjustable set of lenses collectively implementing lens 218) may also be altered to achieve some of the differences in characteristics described above. For example, the projector may achieve different characteristics by mechanically and/or electrically reconfiguring (e.g., sliding, moving, etc.) projector component 216, lens 218, or components associated therewith such as those described above for lens 210. As such, another exemplary projector parameter that may be selected by device 200 (e.g., by image projection control module 214) may designate a particular optical configuration from a plurality of different optical configurations (e.g., each providing a different configuration of projector component 216 and/or lens 218) supported by the projector.

In addition to the components of device 200 associated with the camera and the projector, device 200 may further include additional components such as one or more spatial sensors 222, one or more components implementing power and other circuitry 224, and/or any other circuitry or mechanical or electrical components as may serve a particular implementation.

Spatial sensors 222 may include various sensors configured to facilitate device 200 in determining where and how device 200 is located and oriented in space. For example, spatial sensors 222 may include gyro sensors, GPS and other locational sensors, accelerometers and other motion sensors, compasses and other magnetic sensors, and/or any other suitable spatial sensors for determining a spatial orientation of device 200, for determining a spatial location (e.g., an absolute or relative location) of device 200, for detecting movement of device 200 in space, or the like. In some examples, spatial sensors 222 may include a wireless radio component (e.g., for communication with a WiFi network, a cellular network, etc.) that is configured to determine location by proximity to a particular network or network hub (e.g., as determined by a network name, a signal strength, etc.). As will be described below, spatial sensors 222 may be useful for determining when a virtual target object (e.g., a target object that is not visible in a video feed) is included within a field of view of the camera.

Power and other circuitry 224 may include a battery or other power supply and associated circuitry configured to deliver power to the camera and projector components of device 200 described above. Power and other circuitry 224 may further include any other mechanical or electrical components as may serve a particular implementation. For instance, additional computing components (e.g., processor components, memory components, storage components, etc.) may be implemented within power and other circuitry 224 as may be appropriate. As another example, power and other circuitry 224 may include lighting equipment such as a camera flash lamp, an infrared lamp and/or sensor for implementing night vision projections of augmented reality content into the real-world environment, or the like.

In operation, augmented reality presentation systems and augmented reality projection devices such as system 100, device 110, and/or device 200 may project augmented reality content into a real-world environment by performing any of various operations as may serve a particular implementation. For example, certain operations may be performed during an initialization process (e.g., a calibration process or the like) and/or at periodic times during the lifetime of the augmented reality projection device (e.g., in response to a button press or other option selected in any suitable way). These operations may be referred to herein as special operations. Once the special operations have been performed, other operations may be performed during normal use of the augmented reality projection device. These operations may be referred to herein as normal operations.

Figure 3:
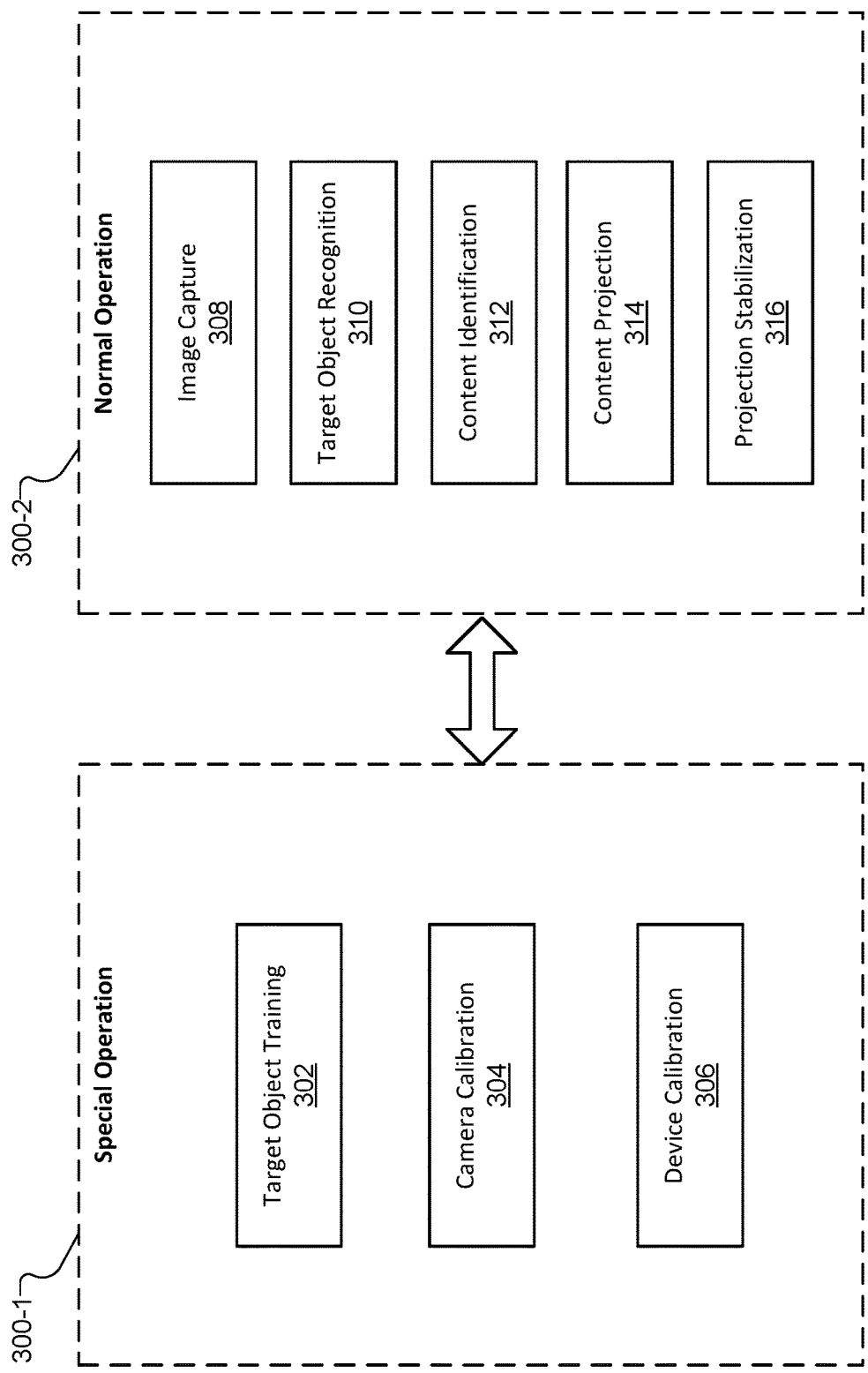
FIG. 3 illustrates exemplary operations that may be performed by an augmented reality presentation system to project augmented reality content into a real-world environment according to principles described herein.

To illustrate various special and normal operations, FIG. 3 shows exemplary operations 300 (e.g., operations 300-1 and 300-2) that may be performed by an augmented reality presentation system such as system 100 or the augmented reality presentation system integrated into device 200 to project augmented reality content into a real-world environment. Specifically, FIG. 3 illustrates a plurality of special operations 300-1 including a target object training operation 302, a camera calibration object 304, and a device calibration operation 306, as well as a plurality of normal operations 300-2 including an image capture operation 308, a target object recognition operation 310, a content identification operation 312, a content projection operation 314, and a projection stabilization operation 316. Each of operations 300 will now be described in more detail with reference to various aspects of FIGS. 4A through 9B below.

As mentioned above, special operations 300-1 may each be performed before an augmented reality projection device will be able to properly perform normal operations 300-2. For example, target object training operation 302 may be performed by an augmented reality presentation system prior to projecting augmented reality content into a real-world environment in order to designate one or more objects within the real-world environment to act as target objects that are to be identified and augmented. Specifically, target object training operation 302 may include analyzing, storing, predetermining, designating, and/or otherwise setting up physical and/or virtual target objects included within the real-world environment for the augmented reality projection device to later identify and augment (e.g., by projecting augmented reality content onto or near to the target objects).

Target objects designated by target object training operation 302 may be any suitable type of physical or virtual object included within a real-world environment. Physical target objects may include visible real-world objects that may be captured (e.g., represented within a video feed captured by a camera), analyzed, and recognized by an augmented reality presentation system using image recognition techniques or the like. For example, physical target objects may be three-dimensional real-world objects such as tables, chairs, people, particular products (e.g., certain makes of vehicles, particular models of appliances, etc.), certain portions or features of such real-world objects, or the like. In some examples, rather than three-dimensional objects or portions of such objects, physical target objects may be two-dimensional images found in the real-world environment. For example, physical target objects may include symbolic images such as brand logos, generic or specific augmented reality markers (e.g., QR codes, barcodes, etc.), unique images such as paintings or other artwork, and so forth.

In some examples, virtual target objects may be used in addition or as an alternative to physical target objects. Virtual target objects may refer to "markerless" target objects within the real-world environment or, in other words, target objects that are not directly associated with particular real-world objects but rather are associated with other aspects of the real-world environment such as a particular location (e.g., a tagged or designated location not specifically associated with any recognizable physical real-world object) within the real-world environment. As such, virtual target objects may not be visible in the same way as physical target objects are (e.g., able to be captured by a camera and represented within a video feed), but virtual target objects may still be designated and identified in ways that will be described below.

Figure 4A:
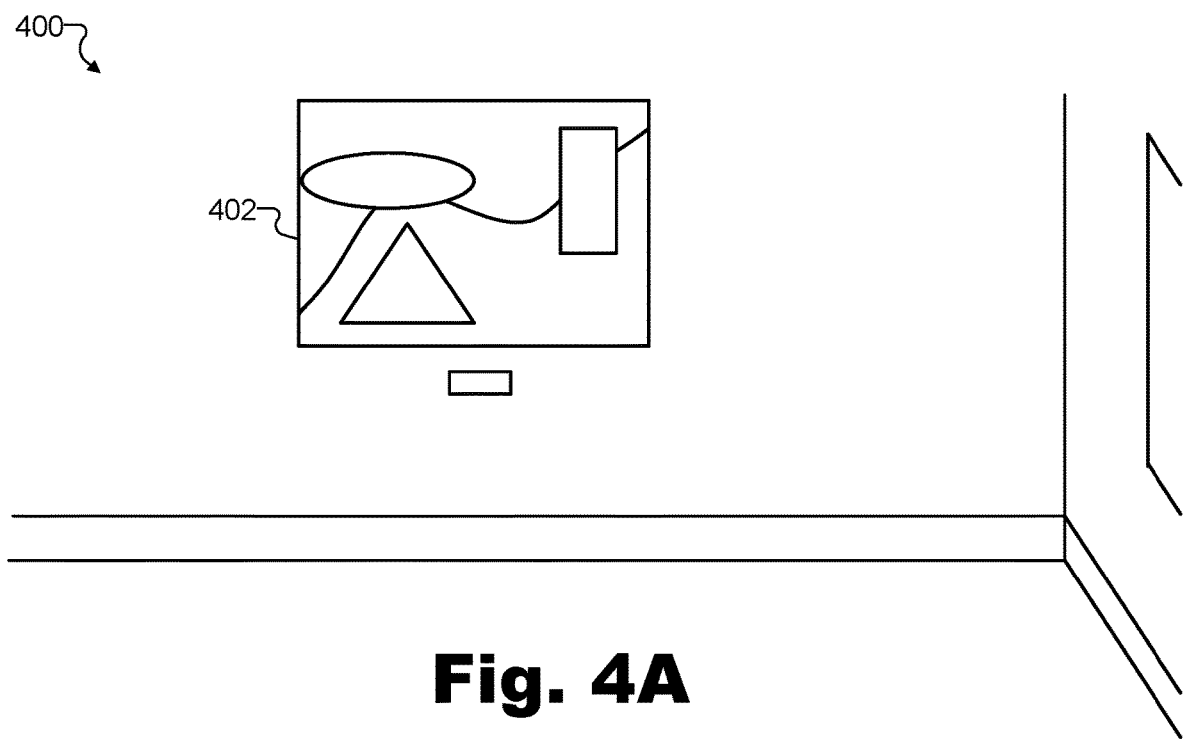
FIG. 4A illustrates an exemplary physical target object physically located within an exemplary real-world environment according to principles described herein.

FIG. 4A illustrates an exemplary physical target object physically located within an exemplary real-world environment. Specifically, a real-world environment 400 shown in FIG. 4A is depicted as an exhibit in an art museum, and an abstract painting 402 within the exhibit is depicted as an exemplary physical target object that is to be designated (e.g., by way of target object training operation 302) for later identification and recognition by an augmented reality presentation system. Target object training operation 302 may be performed to designate painting 402 to be a target object by, for example, identifying and analyzing various features of painting 402, and storing an identified feature set associated with painting 402 in a target object profile within a library of predetermined target object profiles.

The target object profile for painting 402 may be generated in any suitable manner under the direction of any suitable person or process, and may be stored and maintained (e.g., within the library of predetermined target object profiles) within any suitable storage facility as may serve a particular implementation. For example, a conventional feature analysis algorithm such as a Binary Robust Invariant Scalable Keypoints ("BRISK") algorithm may be employed to identify prominent features (e.g., corners, lines, etc.) of painting 402 and to represent the identified prominent features in a feature set of a target object profile that may be used to recognize and identify painting 402 later when painting 402 is included within a field of view of a camera of an augmented reality projection device. In other examples, the designated target object associated with painting 402 may be a special augmented reality marker (e.g., a QR code, a barcode, or the like) placed near painting 402, rather than painting 402 itself.

In some examples, target object training operation 302 may be performed using the same augmented reality projection device that will later be used to identify and augment the target object, while in other examples object training operation 302 may be performed using a completely separate augmented reality projection device. In this training mode, a user directing the augmented reality projection device to perform target object training operation 302 may point the device to an object the user desires to train into the system. The device may project a known pattern onto the object such that the camera may detect and track the known pattern in accordance with distortions to the known pattern that are imposed by the shape, orientation, position, etc., of the object. Thus, based on calibration operations performed previously and based on this tracked data of the known pattern projected onto the object, the augmented reality projection device may compute the orientation and position of the camera with respect to the surface of the object. The augmented reality projection device may use an algorithm to warp the image into a frontal planar view, and to auto crop blank regions around the object to automatically define a target object profile. Additionally or alternatively, defining the target object profile may involve presenting the user an opportunity to manually perform, correct, and/or refine the cropping to define the desired target area of the object using a touch screen interface or the like on the device. In still other examples, object training operation 302 may be performed virtually (e.g., using an image from an image database) rather than by using an augmented reality projection device.

Once target object training operation 302 has been performed to generate a target object profile associated with the target object of painting 402, the target object profile may be stored (e.g., with other such target object profiles) in a library of predetermined target object profiles to be accessed by augmented reality presentation systems associated with users who will later be located in real-world environment 400 and may wish to experience augmented reality content associated with painting 402. Such a library may be stored in any suitable storage facility that the augmented reality presentation systems may access. For example, the library may be stored on a storage facility of an augmented reality projection device integrated with an augmented reality presentation system such as device 200. When a user of device 200 enters the museum, for instance, he or she may be able to download, onto device 200, museum-specific content (e.g., including the library of predetermined target object profiles) as a paid or complimentary service associated with entry to the museum. In other examples, the library may be stored on a storage facility associated with the museum, such as on a server that provides access to the library to augmented reality projection devices within the museum over a wireless local area network or the like. In still other examples, the library may be stored externally to the museum (e.g., on a cloud server that may or may not be associated with the museum or a service provider) and accessed by way of one or more wireless networks, mobile carrier networks, the Internet, and/or any other suitable networks employing any communication technology as may serve a particular implementation.

While the example described in relation to FIG. 4A is specific to a museum with artwork such as painting 402, it will be understood that the principles described in relation to the museum are intended to be exemplary only. As such, the same principles described above may apply in any of various different real-world environments associated with various different venues, locations, and scenarios. For instance, applications of the invention may be employed in a factory (e.g., to provide repair or usage instructions for particular equipment), an entertainment venue (e.g., an amusement park ride, a haunted house, etc.), a home, or in any other environment as may serve a particular implementation.

In certain examples, target objects may not be physical real-world objects (e.g., such as painting 402), but, rather, may be virtual objects within the real-world environment. For example, as described above, virtual target objects may not be visible within the real-world environment and/or may not correspond to specific real-world objects, but, rather, may be associated with particular locations or other aspects of the real-world environment.

As one example, virtual target object training 302 may be performed for virtual target objects by different users of respective augmented reality projection devices who are playing a virtual hide and seek game. For instance, one user may "hide" a virtual target object (e.g., for other users to later "seek" or search for) at a particular location within a real-world environment by designating the particular location as a site of the virtual target object using a button press or other selection mechanism provided by the augmented reality projection device.

As another example, a user may designate a markerless surface (e.g., an anchoring point at a particular portion of a white, featureless wall) as a makeshift screen for displaying augmented reality content projected onto the screen. This may allow a user to take advantage of stabilization features of augmented reality presentation systems and/or augmented reality projection devices described herein to project and view content (e.g., watch a video, read text, etc.) at a particular location. For instance, one or more people may enjoy an impromptu content presentation using an augmented reality projection device that automatically stabilizes the projection so that the image content remains steady and easy to view even though the projector may be handheld by a user rather than statically mounted on a tripod or other such stabilizing mechanism.

Figure 4B:
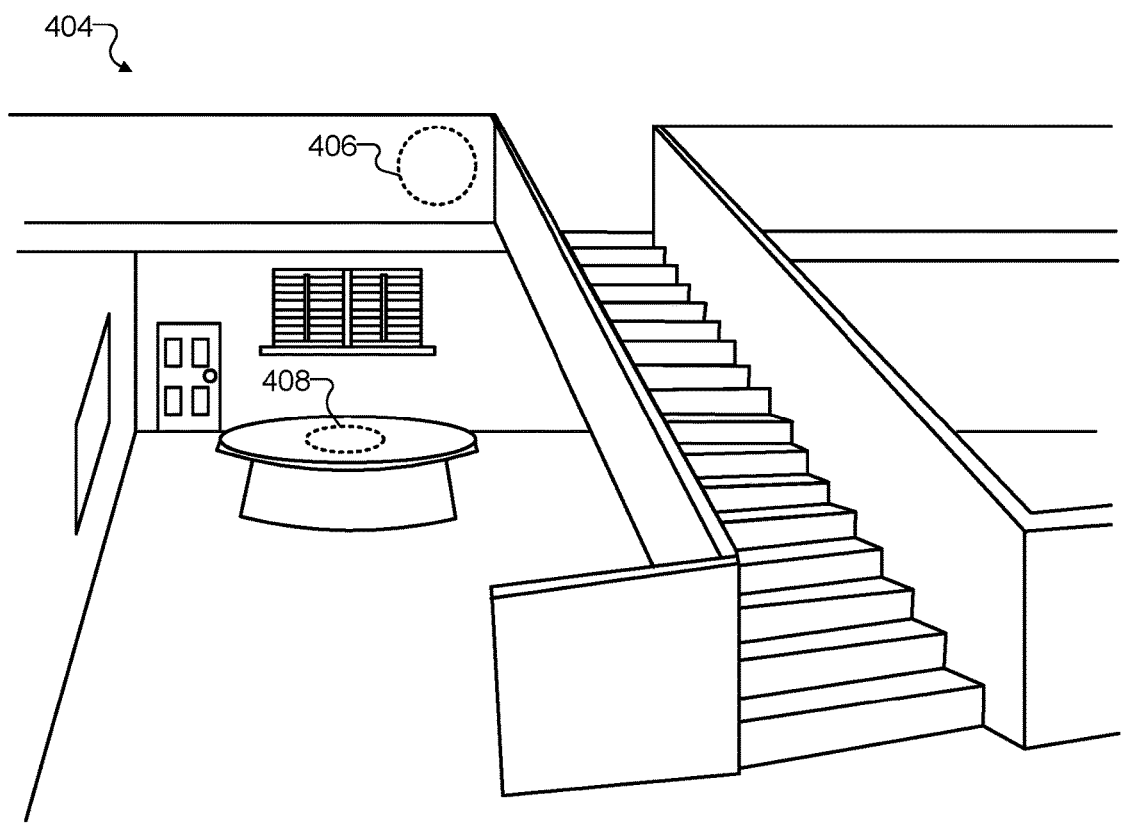
FIG. 4B illustrates exemplary virtual target objects virtually located within an exemplary real-world environment according to principles described herein.

FIG. 4B illustrates exemplary virtual target objects virtually located within an exemplary real-world environment. Specifically, a real-world environment 404 is depicted as an interior of a home including, for example, a stairway leading to an overlook area of a second level, a dining area having a table and other objects, and so forth. In FIG. 4B, a first virtual target object 406 is illustrated to be disposed on the overlook at the top of the stairway while a second virtual target object 408 is illustrated on the tabletop of the dining room table. As described above, these virtual target objects may be designated previously by one user for discovery by another (e.g., in a hide and seek game or the like), may be designated by a particular user for his or her own immediate use (e.g., as a makeshift screen or the like), or may be designated by any other person for any other use as may serve a particular implementation.

In some examples, target object training operation 302 may be performed, for virtual target objects such as target objects 406 and 408, in a similar way as for physical target object such as painting 402, described above. Specifically, for example, one or more prominent features of the overlook area and/or the dining room table may be analyzed and stored in respective target object profiles associated with target objects 406 and 408. However, because virtual target objects may not be directly associated with readily recognizable real-world objects (e.g., paintings, augmented reality markers, etc.), it may be difficult in certain situations to detect a sufficiently unique feature set for real-world objects near where virtual target objects are placed. For example, the wall area upon which target object 406 is located and/or the tabletop area upon which target object 408 is located may be relatively featureless, making it difficult for augmented reality presentation systems to later recognize these areas based solely on captured visual information.

Accordingly, target object training operation 302 may further include detecting, analyzing, and storing various aspects of a location and/or an orientation that an augmented reality projection device may have when the virtual target objects are within the field of view. For example, such aspects may be detected based on information detected by spatial sensors of the augmented reality projection device such as spatial sensors 222 of device 200. Data representative of the location and orientation information detected by the spatial sensors may be included within a target object profile for a particular target object along with information representative of a visual feature set for the target object and/or any other information as may serve a particular implementation.

Returning to FIG. 3, special operations 300-1 include two types of calibration that may be performed prior to normal operation of an augmented reality presentation system along with the target object training operation 302 that has been described.

First, camera calibration operation 304 may be performed with respect to a camera of a particular augmented reality projection device prior to the device being used. Camera calibration operation 304 may be performed by determining intrinsic parameters of the camera such as a focal length, an image sensor format, a principal point (e.g., an image center point), a lens distortion, and/or any other suitable intrinsic parameters associated with the camera. Such calibration may be done in any suitable way such as by capturing and analyzing a known and readily-recognizable pattern (e.g., a checkboard pattern or the like).

Second, device calibration operation 306 may be performed with respect to both the camera and the projector within a particular augmented reality projection device. Specifically, device calibration operation 306 may be performed to determine a rotation and translation (e.g., a heading and position) of a camera and a projector statically mounted alongside one another within the augmented reality projection device. For example, the rotation and translation may be determined for the camera and projector in relation to one another in relation to a local coordinate system associated with the augmented reality projection device or in relation to a world coordinate system. Device calibration operation 306 may be performed to facilitate dynamic stabilization of projections, as will be made apparent below. However, it will be understood that device calibration operation 306 may be optional (e.g., may be omitted) for implementations of the systems and methods for projecting augmented reality content into a real-world environment that do not involve dynamically stabilizing the projections.

For purposes of stabilizing a projection on a particular portion of a physical surface within a real-world environment, the relationship between an image sensor component within an augmented reality projection device (e.g., image sensor 208 of device 200) and a projector component within the augmented reality projection device (e.g., projector component 216 of device 200) may be mathematically described by Equation 1, below.

$$[R|T]_{Target} = [R|T]_{Sensor} * [R|T]_{Augmented}^{(-1)} \quad \text{(Equation 1)}$$

In Equation 1, each variable "[R|T]" refers to a matrix representation of particular rotation and translation parameters describing the position and orientation of a particular component. Specifically, $[R|T]_{Target}$ represents a matrix describing a position and orientation of a specific portion of a physical surface within a real-world environment upon which the projection is projected in relation to the image sensor of the camera. $[R|T]_{Sensor}$ represents a matrix describing a relative position and orientation difference between the image sensor of the camera and the projector component. $[R|T]^{(-1)}_{Augmented}$ represents an inverse matrix of a matrix describing a position and orientation of a model of augmented reality content to be projected with respect to the projector component. The "*" operator in Equation 1 represents a matrix multiplication.

Accordingly, to perform device calibration operation 306, an augmented reality presentation system must solve for $[R|T]_{Sensor}$ for a known (e.g., controlled) target matrix $[R|T]_{Target}$ and inverse augmented matrix $[R|T]^{(-1)}_{Augmented}$. The target matrix and augmented matrix may be setup and controlled in any suitable way during device calibration operation 306 to allow the sensor matrix $[R|T]_{Sensor}$ to be determined. Thereafter, as will be described below, this calibrated value for $[R|T]_{Sensor}$ will be used in Equation 1 to dynamically determine, in real time during normal operation, the augmentation matrix (e.g., to determine how augmented reality content is to be rotated and transformed so as to maintain a stabilized appearance with respect to the portion of the physical surface onto which it is projected).

Normal operations 300-2 may be performed consecutively or concurrently with one another (e.g., in real time) once special operations 300-1 have been successfully performed to calibrate the camera, to (optionally) calibrate the augmented reality projection device, and to train (e.g., designate) at least one target object. However, while special operations 300-1 may, in some examples, be treated as one-time, initialization-type operations, it will be understood that, in other examples, special operations 300-1 may be repeated periodically (e.g., before or after each normal operation session, while normal operations 300-2 are ongoing, etc.). For example, as described above, target object training operation 302 may be performed under the direction of users to train new target objects in various scenarios described above. Or, as another example, if the augmented reality projection device is altered in some way (e.g., dropped or damaged, repaired to receive new components, etc.), camera calibration operation 304 and/or device calibration operation 306 may be performed again. Each of normal operations 300-2 will now be described.

Image capture operation 308 may include capturing a portion of a real-world environment that is included within a field of view of a camera within an augmented reality projection device, as described above. Thus, for example, image capture operation 308 may generate a video feed of images that the camera captures from the real-world environment.

Figure 5:
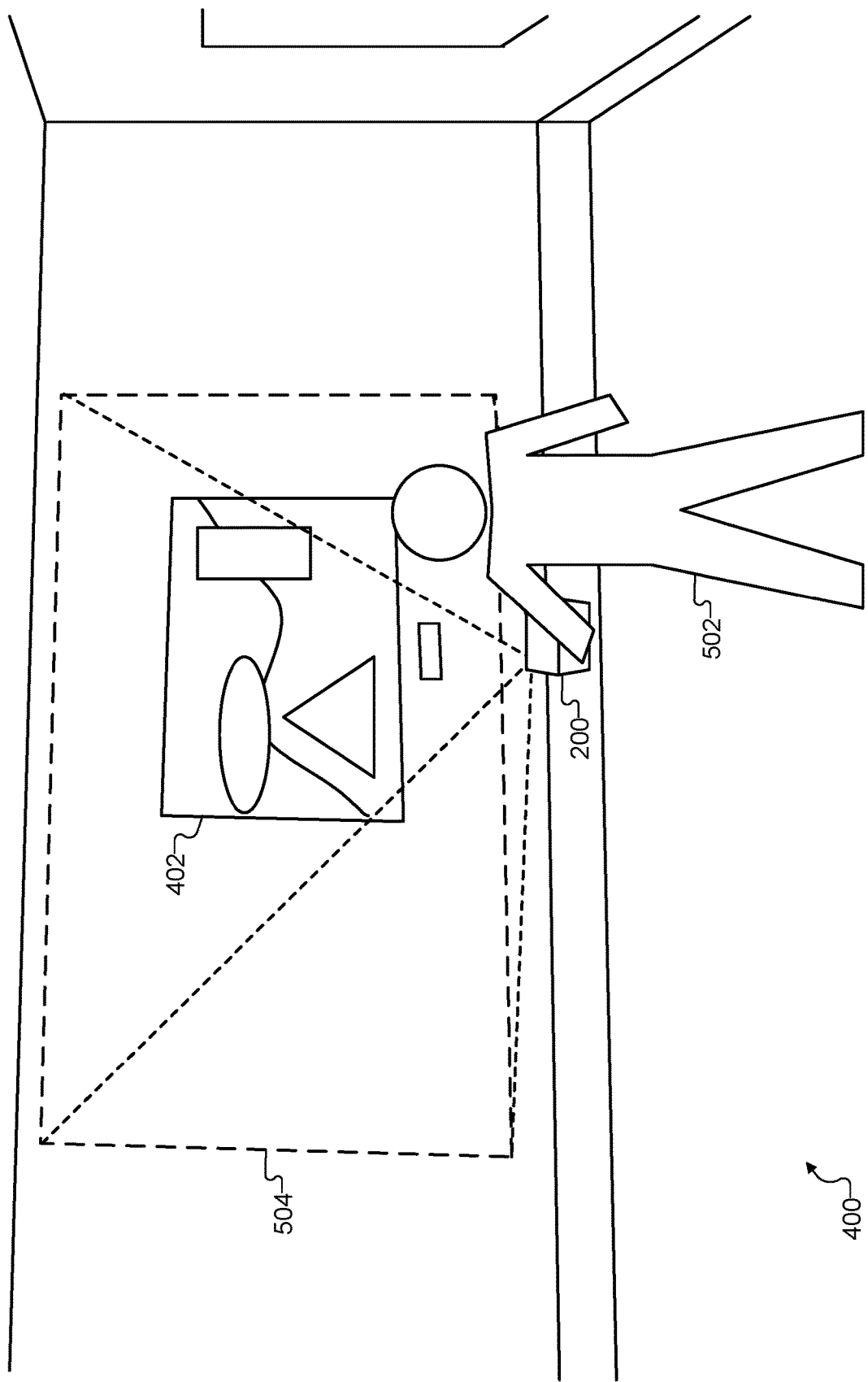
FIG. 5 illustrates an exemplary image capture operation being performed by the integrated implementation of the augmented reality presentation system and the augmented reality projection device of FIG. 2 according to principles described herein.

To illustrate, FIG. 5 depicts an exemplary image capture operation 308 being performed by device 200 within real-world environment 400 (i.e., the real-world environment including the museum exhibit featuring painting 402 described above). As shown, device 200 may be operated by (e.g., performing operations under the direction of) a user 502 who holds device 200 is his or her hand in a manner analogous to holding a flashlight. FIG. 5 shows that, while user 502 points device 200 at a physical surface (e.g., a wall) upon which painting 402 is displayed, a field of view 504 of the camera within device 200 extends over most of the wall, including encompassing the entirety of painting 402. However, it will be understood that user 502 may be free to move and rotate device 200 so that, at other times, field of view 504 may extend over other areas not including the entirety of painting 402. For example, user 502 may point device 200 left, right, up, down, and/or may carry device 200 closer to or farther from painting 402 at will. Additionally, as described above, it will be understood that field of view 504 may be determined in part by sensor parameters (e.g., particular lenses, image sensors, optical configurations, etc.) that may be selected for the camera of device 200 at any particular time.

The next normal operation 300-2 shown in FIG. 3 is target object recognition operation 310. In target object recognition operation 310, an augmented reality presentation system may determine that a target object located within a real-world environment is included within the field of view of the camera. For example, referring to the example illustrated in FIG. 5, device 200 may determine that the target object of painting 402 is included within (e.g., fully or partially included within) field of view 504. This determination may be performed by applying object recognition techniques to images of real-world objects captured in the video feed, by determining a location and/or orientation of device 200 with respect to a virtual target object using spatial sensors 222, and/or in any other suitable way.

Figure 6:
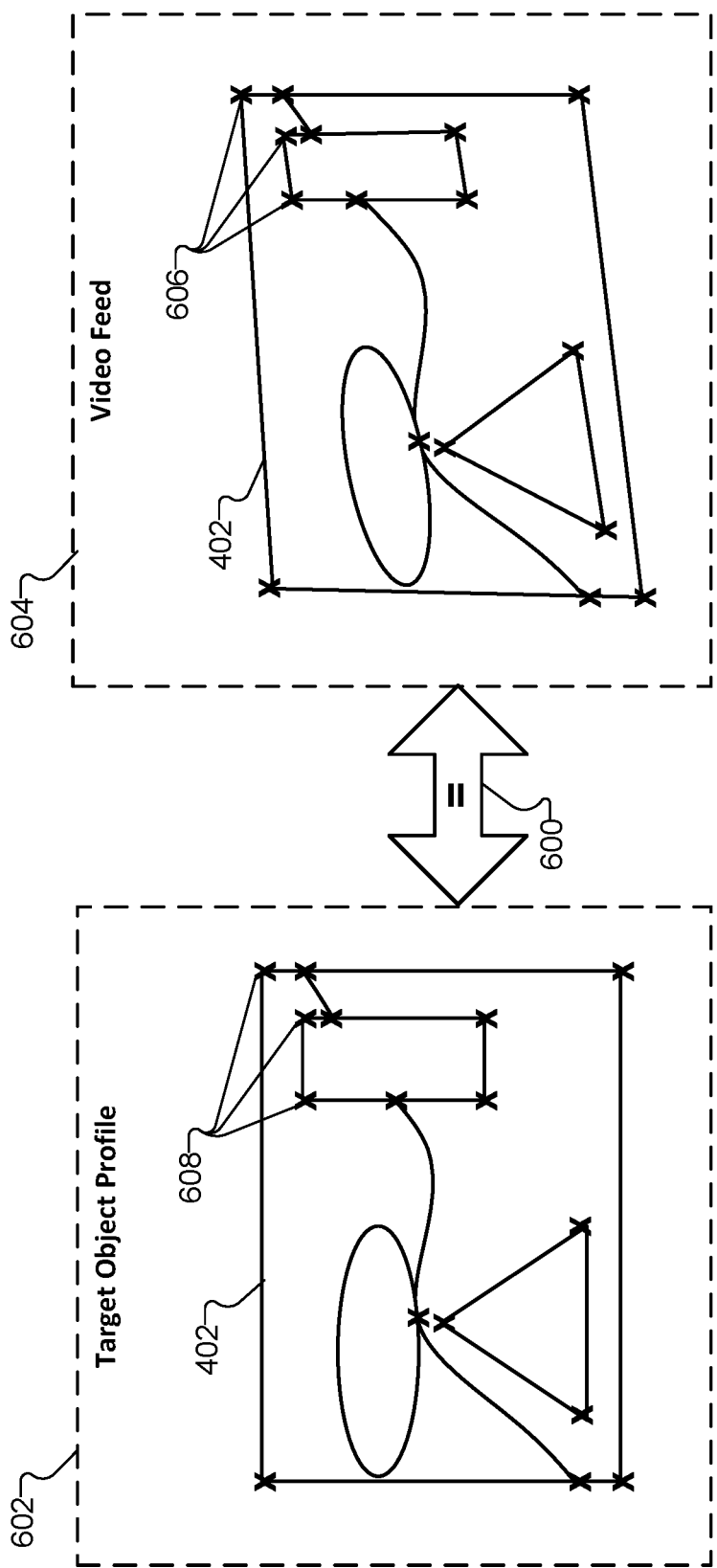
FIG. 6 illustrates an exemplary target object recognition operation being performed by the integrated implementation of the augmented reality presentation system and the augmented reality projection device of FIG. 2 according to principles described herein.

For example, FIG. 6 illustrates an exemplary target object recognition operation 310 being performed by device 200 based on a video feed captured by the camera of device 200 and depicting portions of real-world environment 400 within field of view 504. Specifically, as shown, a target object recognition 600 may be performed by target object recognition operation 310 by comparing data from a target object profile 602 with data detected within a video feed 604 captured by the camera. By recognizing painting 402 within video feed 604 in this way, device 200 may determine that the target object of painting 402 is included within field of view 504 of the camera.

For a target object such as painting 402 that is a physical target object physically located within real-world environment 400, system 200 may determine that the target object is included within field of view 504 by identifying (e.g., within video feed 604) a feature set 606 of the physical target object and determining that the identified feature set 606 matches a feature set 608 of target object profile 602 (e.g., a target object profile from a library of predetermined target object profiles). A feature set such as feature set 606 and/or 608 may be determined and matched in any suitable way. For example, various prominent features (e.g., corners, etc.) represented by Xs in FIG. 6 may be selected for feature sets 606 and 608 because these features may be readily detectable by image processing algorithms regardless of whether the image is viewed straight on (e.g., such as is the case for target object profile 602), at an angle (e.g., such as is the case for the representation of painting 402 in video feed 604), at relatively close proximity, at a relatively far distance, or the like. Additionally feature sets such as feature sets 606 and 608 may be matched when one is a mirror image to the other, when one is upside down in relation to the other, or when the features sets are otherwise detected in different orientations and/or dispositions.

Feature matching illustrated in FIG. 6 may provide point-to-point correspondences between the target object and a reference image represented in the target object profile. However, once target object recognition 600 has successfully been performed, it may be computationally expensive to continuously perform feature matching in this way from frame to frame of video feed 604. Accordingly, in certain examples, a few features from feature sets 606 and 608 may each be tracked from frame to frame such that reasonable assumptions about locations of other features may be made without repeatedly performing feature matching operations for each individual frame.

As mentioned above, in examples involving virtual target objects, target object recognition operation 310 may be performed in a different way. For example, for a target object that is a virtual target object virtually located within a real-world environment (e.g., such as one of target objects 406 or 408 described above), feature matching may also be used in a similar way (e.g., to recognize the overlook wall above the stairway in the case of target object 406, to recognize the surface of the tabletop in the case of target object 408, etc.). Additionally, as mentioned above in the context of training these target objects to generate respective target object profiles, spatial sensors (e.g., spatial sensors 222 of device 200) may facilitate determining that virtual target objects are included within a field of view of a camera. Specifically, device 200 may determine that such a target object is included within the field of view of the camera by determining (e.g., based on sensor output from one or more sensors included within device 200 such as spatial sensors 222) a location and orientation of device 200 with respect to a global coordinate system associated with real-world environment 400. Device 200 may then determine (e.g., based on the determined location and orientation and based on a target object profile associated with the virtual target object in a library of predetermined target object profiles) that the virtual target object is included within the field of view of the camera.

Once a video feed has been captured (e.g., by way of image capture operation 308) and a target object has been determined to be included within the field of view of the camera (e.g., by way of target object recognition operation 310) as described above, content identification operation 312 may be performed. For example, content identification operation 312 may involve identifying (e.g., determining, accessing from a storage facility, searching for, downloading, etc.) augmented reality content associated with the target object determined to be included within the field of view.

The augmented reality content identified within content identification operation 312 may be any type of content as may serve a particular implementation. For instance, the augmented reality content may include light projections (e.g., a presence or an absence of light, different colors of light, etc.), still images, textual content, video (e.g., with or without associated audio), and/or any other type of content that may be presented by way of a projector and as may serve a particular implementation. In some examples, augmented reality content may be associated with the identified target object (e.g., provided so as to augment the target object). For example, in the example illustrated above where the target object is painting 402 within an art museum, augmented reality content identified to be associated with painting 402 may include additional information (e.g., textual information, audio/video information, etc.) about painting 402, the artist who painted it, the period of art in which it was created, or the like. For instance, the augmented reality content associated with painting 402 may include a short video introduction in which an art expert describes painting 402.

In other examples, a target object may be a different type of real-world object such as an appliance, and the augmented reality content may include repair instructions or troubleshooting information (e.g., text, videos, etc.), a user's manual, or other content specifically related to the particular appliance and/or problems the appliance may be exhibiting. In still other examples, a target object may be a virtual target object (e.g., a virtual target object hidden by a user in a hide and seek game) and the augmented reality content may be a message or image created by the user that placed the virtual target object. Various other examples of augmented reality content for various other applications of augmented reality projection devices may be employed as may serve a particular implementation.

Augmented reality content may be identified in any suitable way. For example, an augmented reality presentation system may access data stored within a target object profile of an identified target object, follow a link or other instructions included in the target object profile to access the augmented reality content, and/or determine, find, and access the augmented reality content in any other suitable way.

Figure 7:
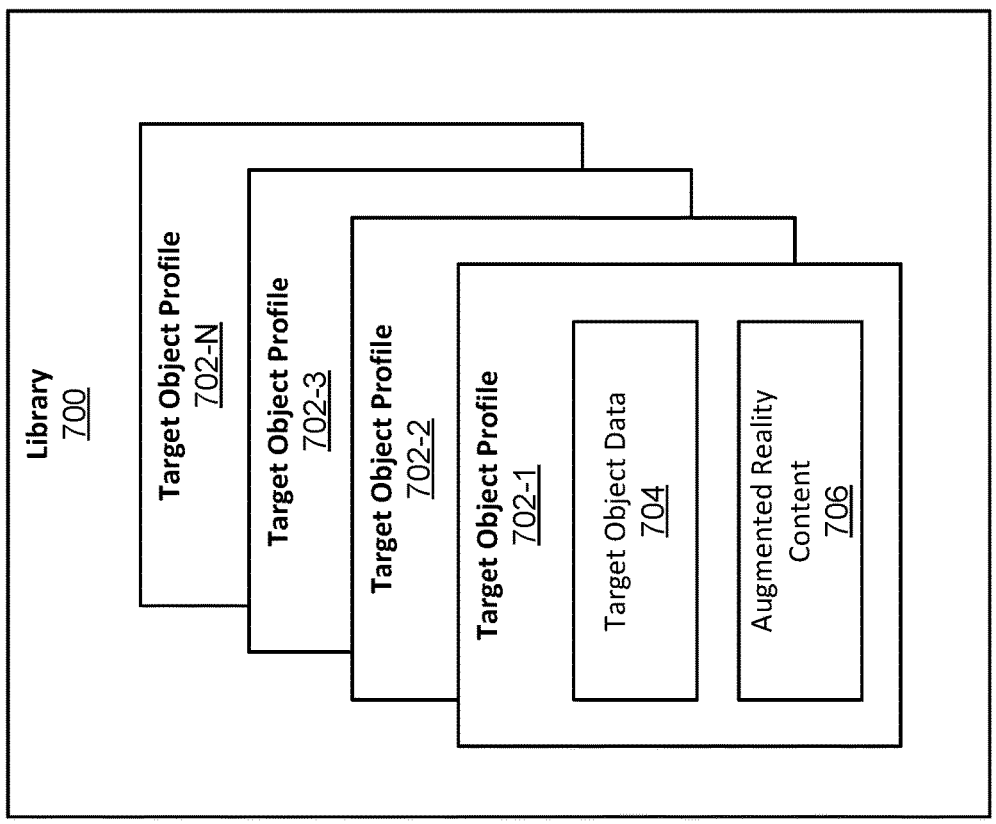
FIG. 7 illustrates an exemplary library of predefined target object profiles according to principles described herein.

To illustrate, FIG. 7 shows an exemplary library 700 of predefined target object profiles 702 (e.g., target object profiles 702-1 through 702-N). As explicitly shown in target object profile 702-1 (and as will be understood to similarly be present in each of the additional target object profiles 702-2 through 702-N), each target object profile 702 may include target object data (e.g., such as target object data 704 in target object profile 702-1) and augmented reality content (e.g., such as augmented reality content 706 in target object profile 702-1).

Target object profile data 704 may include information used to determine that a target object is included within the field of view of the camera. For example, data illustrated in target object profile 602 in FIG. 6 (e.g., including data representative of feature set 608, etc.) may be included within target object profile data 704, as well as data associated with a spatial location of a virtual target object to facilitate determining that a virtual target object is included within the field of view.

Augmented reality content 706 may include data representative of augmented reality content (e.g., data accessible directly from library 700) or a link or instructions whereby an augmented reality presentation system may access data representative of the augmented reality content. For example, rather than having video data directly stored in library 700 (e.g., which may be stored within a storage facility of an integrated augmented reality projection device such as device 200), augmented reality content 706 may be implemented by a link to video data stored elsewhere (e.g., on a local server, on a remote cloud server, etc.). As another example, augmented reality content 706 may be implemented by instructions indicating that augmented reality content is to be accessed by performing an Internet search or the like (e.g., to access information provided by an online encyclopedia or search engine, etc.).

While only target object data 704 and augmented reality content 706 are illustrated in target object profile 702-1 in FIG. 7, it will be understood that any other suitable information may also be included within each target object profile 702 and/or within library 700 generally. For instance, in some examples, data representative of a particular physical surface upon which augmented reality content is to be projected may be included within library 700. For example, a three-dimensional model of the surface, data representative of the curvature of the surface, a color of the surface, or other suitable characteristics may be stored to allow augmented reality content to be projected onto a curved surface with minimal or no distortion, to be projected without color being washed out, or the like.

Referring again to normal operations 300-2 in FIG. 3, an augmented reality presentation system may perform content project operation 314 subsequent to or concurrently with operations 308 through 312, described above. More specifically, once augmented reality content associated with a target object in the field of view of the augmented reality projection device has been identified and accessed, the augmented reality presentation system may direct a projector to project the content onto a physical surface within the real-world environment.

To illustrate, FIG. 8 shows an exemplary content projection operation 314 being performed by device 200. As introduced in previous figures illustrated above, user 502 may operate device 200 by pointing device 200 in the direction of painting 402 within the museum exhibit of real-world environment 400. As such, field of view 504 of the camera of device 200 may extend over the entirety of painting 402 and over a large portion of the wall upon which painting 402 is displayed. FIG. 8 further illustrates that the projector of device 200 projects augmented reality content 802 onto a physical surface 804 included within real-world environment 400 (i.e., the wall upon which painting 402 is presented). As shown, augmented reality content is included within a field of view 806 of the projector that is similar to (but distinct from) field of view 504 of the camera.

As shown, while field of view 806 fully extends over painting 402 and much of physical surface 804, augmented reality content 802 is projected within a relatively small portion of field of view 806 so as to be presented at a particular portion 808 of physical surface 804 that is next to painting 402. For example, portion 808 may be defined within the target object profile for painting 402 and may be designated to be adjacent to (e.g., near but not directly overlapping with) painting 402, to be of an appropriate size (e.g., a size that is large enough to be easy for user 502 to see while not being so large as to overpower painting 402), and/or to have other desirable characteristics.

In certain implementations, as the projector of device 200 projects augmented reality content 802 onto physical surface 804, augmented reality content 802 may be viewable by a plurality of people in real-world environment 400. For example, even though user 502 is the only person shown to have an augmented reality projection device (i.e., device 200) for projecting augmented reality content into real-world environment 400, augmented reality content 802 may be viewable not only by user 502, but also by another person 810 and/or by any other people in real-world environment 400. This may be advantageous compared to a conventional augmented reality player device which, if operated by user 502, would only allow user 502 to view augmented reality content 802 (e.g., by way of a display screen worn by user 502 or the like). In contrast with such conventional systems, device 200 may present augmented reality content 802 only on physical surface 804 (e.g., at portion 808 of physical surface 804) and may abstain from directing augmented reality content 802 to be displayed on a screen visible to only one person (e.g., a screen connected to device 200, a screen visible only to user 502, etc.).

As shown, field of view 504 of the camera included within device 200 and field of view 806 of the projector included within device 200 may substantially overlap due to the fact that the camera and the projector may be mounted (e.g., statically mounted) alongside one another within the enclosure of device 200, as described above. As a result, as the projector projects augmented reality content 802 onto physical surface 804, the target object of painting 402 may be included, together with portion 808 of physical surface 804 onto which augmented reality content 802 is projected, within field of view 504 of the camera, as shown.

In certain implementations, the projection of augmented reality content 802 onto physical surface may not be dynamically stabilized. In other words, once device 200 identifies the target object and begins projecting augmented reality content 802, the projection may move around physical surface 804 and/or other physical surfaces within real-world environment 400 in accordance with where user 502 points device 200 (e.g., including getting bigger as the projector moves away from a physical surface and getting smaller as the projector gets closer). In such implementations, projection stabilization operation 316 (i.e., the final normal operation 300-2 illustrated in FIG. 3) may be omitted.

In other implementations, however, projection stabilization operation 316 may be performed to dynamically stabilize the projection of augmented reality content 802 to remain, with the same relative size and orientation, at portion 808 of physical surface 804. For example, by dynamically and continuously performing projection stabilization operation 316, augmented reality content 802 may be stabilized at portion 808 even as user 502 moves and points device 200 in different ways (e.g., as long as portion 808 is included within field of view 806 of the projector). More particularly, as part of directing the projector to project augmented reality content 802 onto physical surface 804, device 200 may direct the projector to dynamically stabilize a projection of augmented reality content 802 at the particular portion 808 of physical surface 804 in response to a change to at least one of a position and an orientation of device 200 with respect to portion 808 of physical surface 804.

As such, having the target object of painting 402 included within field of view 502 as augmented reality content 802 is projected (as described above) may facilitate the dynamic stabilization. For example, this may allow device 200 to keep apprised (e.g., via the video feed in which portions of real-world environment 400 within field of view 504 are captured) of the spatial relationship of device 200 and painting 402 (i.e., the target object adjacent to portion 808 where augmented reality content 802 is to be projected).

Figure 9B:
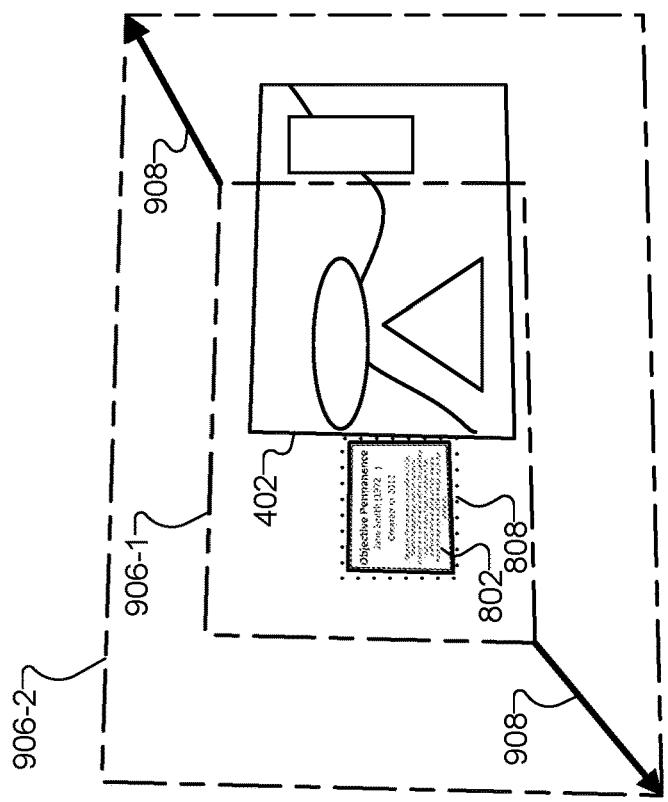
FIG. 9B illustrates another exemplary projection stabilization operation being performed by the integrated implementation of the augmented reality presentation system and the augmented reality projection device of FIG. 2 according to principles described herein.
Figure 9A:
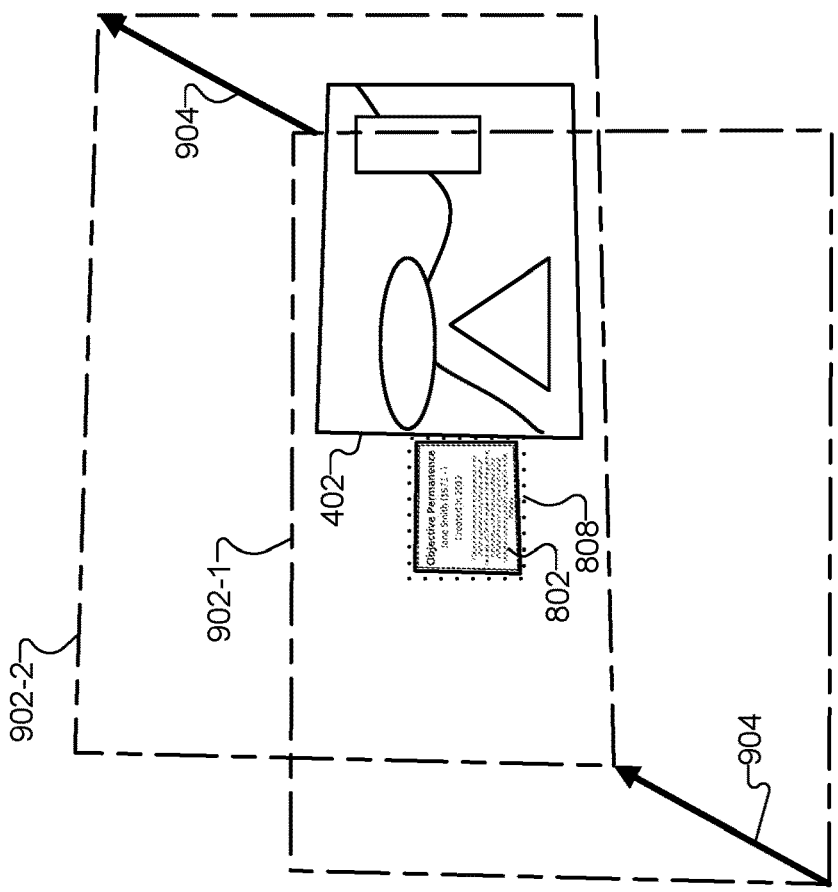
FIG. 9A illustrates an exemplary projection stabilization operation being performed by the integrated implementation of the augmented reality presentation system and the augmented reality projection device of FIG. 2 according to principles described herein.

FIGS. 9A and 9B illustrate different exemplary projection stabilization operations 316 being performed by device 200. Specifically, in a first projection stabilization operation 316 illustrated by FIG. 9A, the field of view of the projector of device 200 (e.g., field of view 806 in FIG. 8) is shown to move from a first position 902-1 to a second position 902-2 by way of a change 904 to an orientation of device 200. For example, while painting 402 remains statically placed on the wall, user 502 may reorient device 200 from pointing at position 902-1 to pointing at position 902-2. In spite of this movement, however, it may be desirable for augmented reality content 802 to remain stabilized at portion 808 adjacent to painting 402. Accordingly, in response to change 904, a projection stabilization operation 316 may be performed to reposition the projection of augmented reality content 802 from the middle-top region of the field of view when it is at position 902-1 to being closer to the bottom left corner of the field of view when it is at position 902-2, as shown.

Similarly, in a second projection stabilization operation 316 illustrated by FIG. 9B, the field of view of the projector is shown to grow from a first size 906-1 to a second size 906-2 by way of a change 908 to a position of device 200. For example, while painting 402 remains statically placed on the wall, user 502 may carry device 200 from a position relatively close to painting 402 (e.g., where painting 402 and portion 808 take most of the projector's resolution because the field of view has relatively small size 906-1) to a position further away from painting 402 (e.g., where painting 402 and portion 808 take less of the projector's resolution because the field of view has relatively large size 906-2). As in FIG. 9A, however, it may be desirable for augmented reality content 802 to remain stabilized (e.g., remain at a constant size) at portion 808 adjacent to painting 402 in spite of this change to the position of device 200. Accordingly, in response to change 908, a projection stabilization operation 316 may be performed to resize the projection of augmented reality content 802 from being relatively large (e.g., with respect to size 906-1 of the field of view of the projector) prior to change 908 to being relatively small (e.g., with respect to size 906-2 of the field of view of the projector) after change 908, as shown.

Either or both of the projection stabilization operations 316 illustrated in FIGS. 9A and 9B may be repeatedly performed to maintain stabilization as user 502 moves and reorients device 200 with respect to portion 808 in real-world environment 400. These projection stabilization operations 316 may be performed in any manner as may serve a particular implementation. For example, device 200 may direct the projector to dynamically stabilize the projection of augmented reality content 802 by 1) tracking (e.g., based on the video feed and in response to change 904, change 908, or the like) portion 808 of physical surface 804, 2) determining (e.g., based on the tracking) a changed position and/or a changed orientation of device 200 with respect to portion 808 of physical surface 804, 3) adjusting (e.g., based on the determining of the changed position and/or the changed orientation) augmented reality content 802 (e.g., such as by moving it to a different part of the field of view, increasing or decreasing its size within the field of view, etc.), and 4) directing the projector to project the adjusted augmented reality content onto portion 808 of physical surface 804.

One or more of these steps (i.e., tracking, determining, adjusting, and directing), as well as additional steps as may serve a particular implementation, may be performed concurrently or in any suitable order to perform stabilization operation 316. Each step may be performed in any suitable way. For example, the step of determining the changed position and/or the changed orientation of device 200 with respect to portion 808 may be performed by solving Equation 2 below, which defines the relationship of a pose (e.g., a position and an orientation) of the camera of device 200 with respect to portion 808.

$$s*x = K*P*X \quad \text{(Equation 2)}$$

Specifically, in Equation 2, s represents a scale factor, x represents pixel locations of identified features of the projection of augmented reality content 802, K represents the camera calibration matrix of the camera included within device 200 (e.g., as determined by camera calibration operation 304), P represents the pose of the camera with respect to portion 808 (i.e., the variable that is to be solved for), and X represents the three-dimensional locations of the identified features in space. Because most of the variables in Equation 2 are represented by matrices, Equation 2 may be rewritten in Matrix form as Equation 3, below.

$$s \begin{bmatrix} x \\ y \\ 1 \end{bmatrix} = \begin{bmatrix} f_x & 0 & u_0 \\ 0 & f_y & v_0 \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} X \\ Y \\ Z \\ 1 \end{bmatrix} \quad \text{(Equation 3)}$$

In Equation 3, variables x and y refer to the two-dimensional coordinates of pixel location x in Equation 2. Variables $f_x$ and $f_y$ refer to a focal length and $u_0$ and $v_0$ refer to a principle point of the camera included within the camera calibration matrix K of Equation 2. Variables $r_{11}$ through $r_{33}$ represent the 3×3 rotation matrix of the camera in three-dimensional space (e.g., how the camera is oriented with respect to portion 808). Variables $t_1$ through $t_3$ represent the translation matrix of the camera in three-dimensional space (e.g., where the camera is positioned with respect to portion 808). Variables X, Y, and Z refer to the three-dimensional coordinates of the feature corresponding to the pixel location of x and y. Thus, by solving for variables $r_{11}$ through $r_{33}$ and $t_1$ through $t_3$ in Equation 3 (i.e., solving for the pose matrix P in Equation 2), device 200 may determine, in response to a change such as change 904 or 908, how the camera within device 200 is posed in relation to portion 808.

Based on this calculated pose, as well as based on the spatial relationship between the camera and the projector within device 200 determined during device calibration operation 306 (described above), Equation 1 may be used to perform the step of adjusting augmented reality content 802. For example, because Equation 1 describes the mathematical relationship between image sensor 208 within device 200 and projector component 216 within device 200, augmented reality content 802 may be properly adjusted based on the rotation and translation matrix obtained by solving Equation 1 for $[R|T]_{Augmented}$. Once adjusted in this way, the projection of augmented reality content 802 may be stabilized at portion 808 even as changes 904, 908, and/or other such changes occur during operation of device 200.

Figure 10:
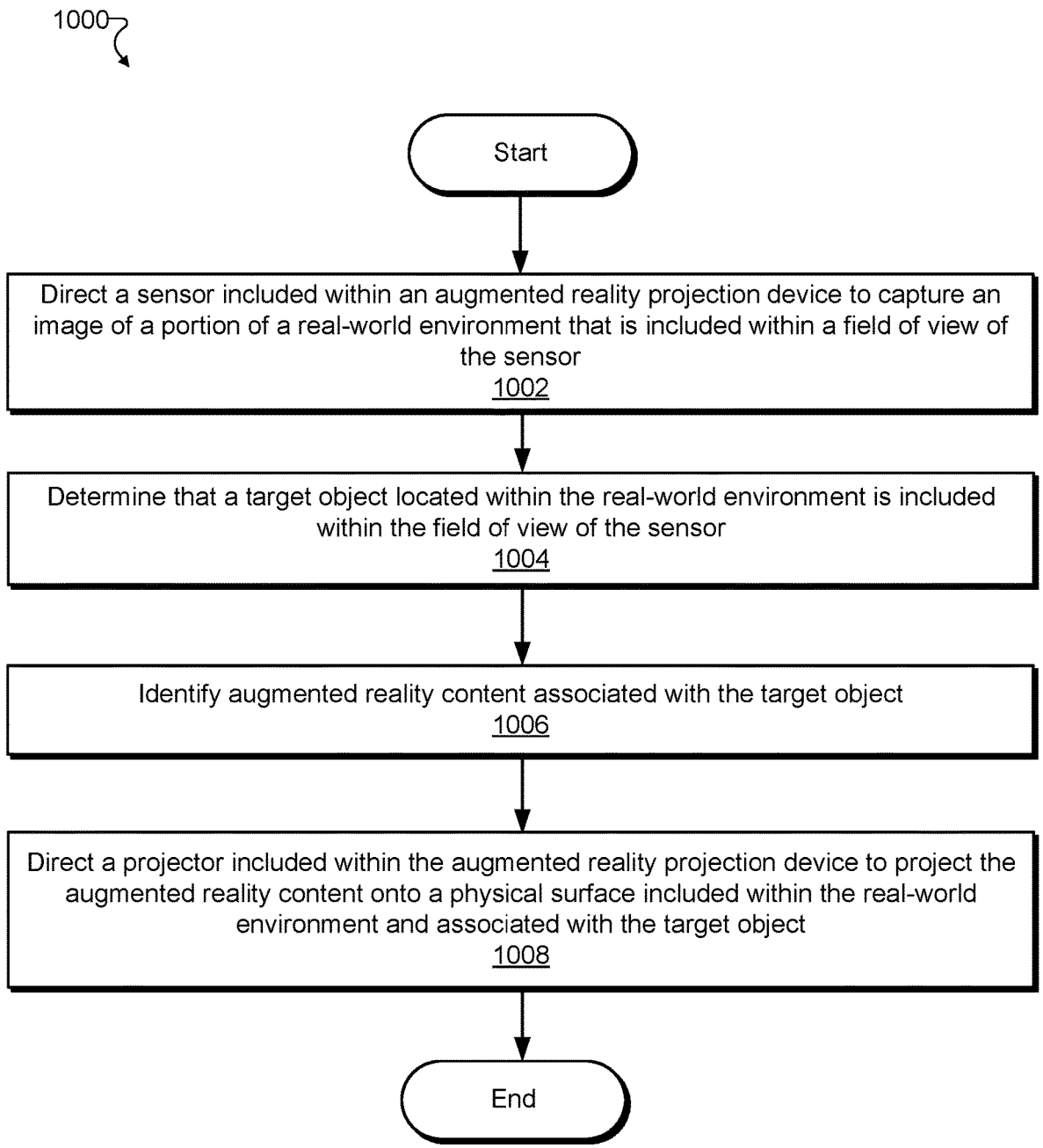
FIG. 10 illustrates an exemplary method for projecting augmented reality content into a real-world environment according to principles described herein.

FIG. 10 illustrates an exemplary method 1000 for projecting augmented reality content into a real-world environment according to principles described herein. While FIG. 10 illustrates exemplary operations according to one embodiment, other embodiments may omit, add to, reorder, and/or modify any of the operations shown in FIG. 10. One or more of the operations shown in FIG. 10 may be performed by system 100 (e.g., operating in conjunction with a separate augmented reality projection device such as device 110), by an augmented reality presentation system integrated with an augmented reality projection device such as device 200, by any components included therein, and/or by any implementations thereof.

In operation 1002, an augmented reality presentation system may direct a camera included within an augmented reality projection device to capture a video feed of a portion of a real-world environment. For example, the portion of the real-world environment may be a portion included within a field of view of the camera. Operation 1002 may be performed in any of the ways described herein.

In operation 1004, the augmented reality presentation system may determine that a target object located within the real-world environment is included within the field of view of the camera. For example, the augmented reality presentation system may determine that the target object is included within the field of view as the camera captures the video feed. Operation 1004 may be performed in any of the ways described herein.

In operation 1006, the augmented reality presentation system may identify augmented reality content associated with the target object. Operation 1006 may be performed in any of the ways described herein.

In operation 1008, the augmented reality presentation system may direct a projector to project the augmented reality content onto a physical surface within the real-world environment and associated with the target object. For example, the projector may be included within the augmented reality projection device and the augmented reality presentation system may direct the projector to project the augmented reality content onto the physical surface as the camera captures the video feed. In some examples, the physical surface may be physically detached from the augmented reality projection device. Additionally, in certain implementations, the physical surface may be included within the field of view of the camera while the augmented reality content is projected onto the physical surface. Operation 1008 may be performed in any of the ways described herein.

Figure 11:
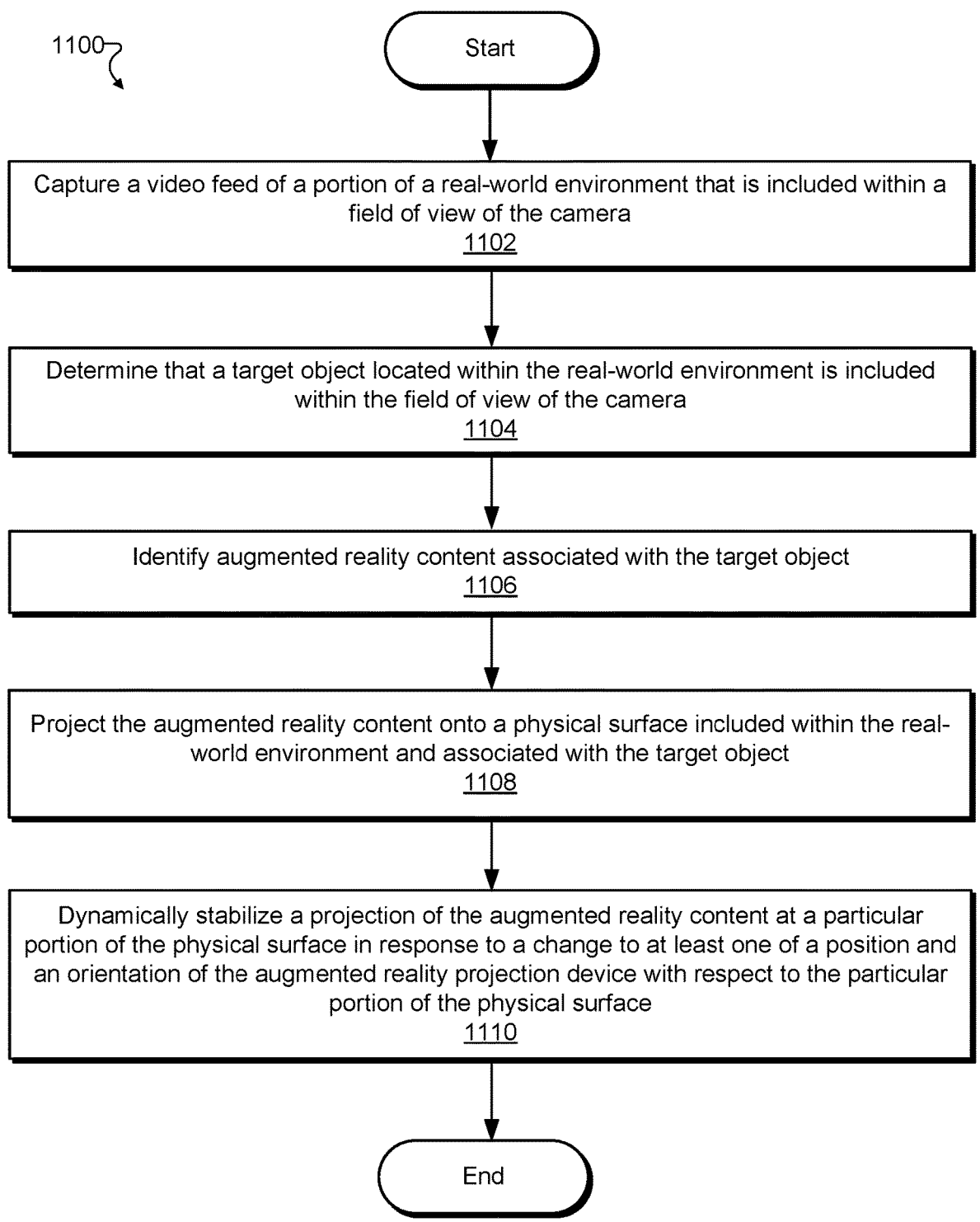
FIG. 11 illustrates another exemplary method for projecting augmented reality content into a real-world environment according to principles described herein.

FIG. 11 illustrates an exemplary method 1100 for projecting augmented reality content into a real-world environment according to principles described herein. While FIG. 11 illustrates exemplary operations according to one embodiment, other embodiments may omit, add to, reorder, and/or modify any of the operations shown in FIG. 11. As with method 1000, one or more of the operations in method 1100 may be performed by system 100, by an augmented reality presentation system integrated within an augmented reality projection device such as device 200, by any components included therein, and/or by any implementations thereof.

In operation 1102, a camera included within an augmented reality projection device may capture a video feed of a portion of a real-world environment. For example, the portion of the real-world environment may be a portion included within a field of view of the camera. Operation 1102 may be performed in any of the ways described herein.

In operation 1104, the augmented reality projection device may determine that a target object located within the real-world environment is included within the field of view of the camera. For example, the augmented reality projection device may determine that the target object is included within the field of view as the camera captures the video feed. Operation 1104 may be performed in any of the ways described herein.

In operation 1106, the augmented reality projection device may identify augmented reality content associated with the target object. Operation 1106 may be performed in any of the ways described herein.

In operation 1108, a projector mounted alongside the camera within the augmented reality projection device may project the augmented reality content onto a physical surface within the real-world environment and associated with the target object. In some examples, the projector may project the augmented reality content onto the physical surface as the camera captures the video feed. Additionally, in certain implementations, the physical surface may be physically detached from the augmented reality projection device and may be included within the field of view of the camera while the augmented reality content is projected onto the physical surface. Operation 1108 may be performed in any of the ways described herein.

In operation 1110, the augmented reality projection device may dynamically stabilize a projection of the projected augmented reality content at a particular portion of the physical surface. For example, the augmented reality projection device may dynamically stabilize the projection in response to a change to at least one of a position and an orientation of the augmented reality projection device with respect to the particular portion of the physical surface. Operation 1110 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 12:
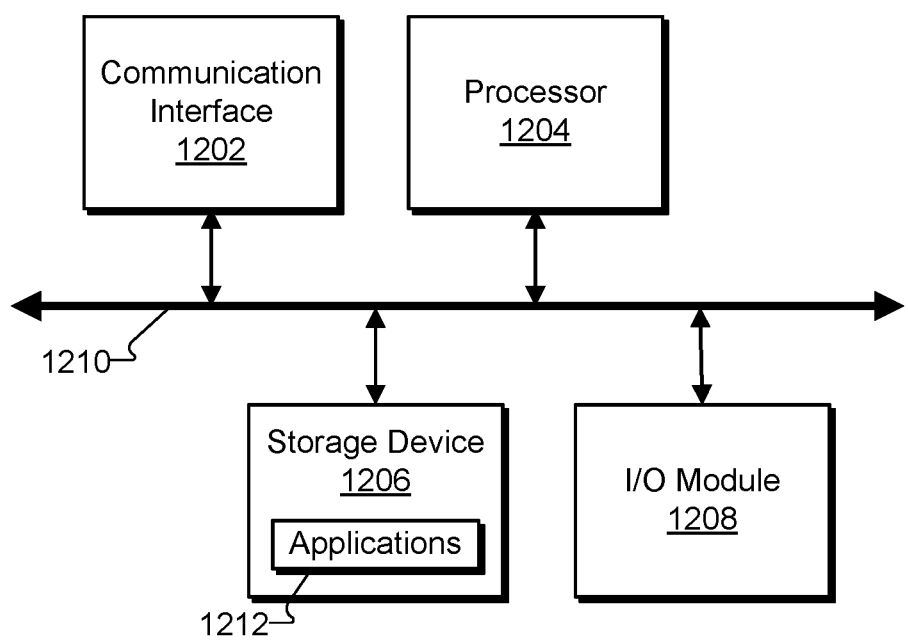
FIG. 12 illustrates an exemplary computing device according to principles described herein.

FIG. 12 illustrates an exemplary computing device 1200 that may be specifically configured to perform one or more of the processes described herein. As shown in FIG. 12, computing device 1200 may include a communication interface 1202, a processor 1204, a storage device 1206, and an input/output ("I/O") module 1208 communicatively connected via a communication infrastructure 1210. While an exemplary computing device 1200 is shown in FIG. 12, the components illustrated in FIG. 12 are not intended to be limiting. Additional or alternative components may be used in other embodiments. Components of computing device 1200 shown in FIG. 12 will now be described in additional detail.

Communication interface 1202 may be configured to communicate with one or more computing devices. Examples of communication interface 1202 include, without limitation, a wired network interface (such as a network interface card), a wireless network interface (such as a wireless network interface card), a modem, an audio/video connection, and any other suitable interface.

Processor 1204 generally represents any type or form of processing unit capable of processing data or interpreting, executing, and/or directing execution of one or more of the instructions, processes, and/or operations described herein. Processor 1204 may direct execution of operations in accordance with one or more applications 1212 or other computer-executable instructions such as may be stored in storage device 1206 or another computer-readable medium.

Storage device 1206 may include one or more data storage media, devices, or configurations and may employ any type, form, and combination of data storage media and/or device. For example, storage device 1206 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1206. For example, data representative of one or more executable applications 1212 configured to direct processor 1204 to perform any of the operations described herein may be stored within storage device 1206. In some examples, data may be arranged in one or more databases residing within storage device 1206.

I/O module 1208 may include one or more I/O modules configured to receive user input and provide user output. One or more I/O modules may be used to receive input for a single virtual experience. I/O module 1208 may include any hardware, firmware, software, or combination thereof supportive of input and output capabilities. For example, I/O module 1208 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1208 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1200. For example, one or more applications 1212 residing within storage device 1206 may be configured to direct processor 1204 to perform one or more processes or functions associated with facilities 102 through 106 of system 100. Likewise, storage facility 108 of system 100 may be implemented by or within storage device 1206.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. An augmented reality projection device comprising:
    an image sensor having a field of view into a real-world environment;
    a spatial sensor configured to detect a location and an orientation of the augmented reality projection device in the real-world environment;
    a projector configured to project content onto a physical surface within the real-world environment; and
    a processor that is coupled to the image sensor, the spatial sensor, and the projector, and that is configured to:
        determine, based on sensor output from the spatial sensor, the location and orientation of the augmented reality projection device,
        determine, based on the determined location and orientation and based on a particular target object profile from a library of predetermined target object profiles, that a virtual target object associated with the particular target object profile is included within the field of view of the image sensor,
        identify content associated with the virtual target object, and
        direct the projector to project the content onto the physical surface within the real-world environment, the physical surface associated with the virtual target object.

2. The augmented reality projection device of claim 1, wherein the augmented reality projection device is physically detached from the physical surface while the content is projected onto the physical surface.

3. The augmented reality projection device of claim 1, wherein the processor is further configured to:
    direct the image sensor to capture an image of a portion of the real-world environment included within the field of view of the image sensor;
    determine, based on the captured image, that a physical target object is included within the field of view of the sensor;
    identify additional content associated with the physical target object; and
    direct the projector to project the additional content associated with the physical target object onto an additional physical surface within the real-world environment, the additional physical surface associated with the physical target object.

4. The augmented reality projection device of claim 1, wherein:
    the processor is further configured to detect, based on the sensor output from the spatial sensor, a change to the determined location and orientation of the augmented reality projection device; and
    the directing of the projector to project the content onto the physical surface includes directing, in response to the detecting of the change to the determined location and orientation of the augmented reality projection device, the projector to dynamically stabilize the projection of the content at a particular portion of the physical surface.

5. The augmented reality projection device of claim 1, wherein the processor is further configured to include the particular target object profile in the library of predetermined target object profiles based on a designation, by a user of the augmented reality projection device, of the virtual target object for use as a makeshift screen.

6. The augmented reality projection device of claim 1, wherein the processor is further configured to include the particular target object profile in the library of predetermined target object profiles based on a designation, by a first user playing a virtual hide and seek game using the augmented reality presentation device, to hide the virtual target object in a location that is to be discovered by a second user playing the virtual hide and seek game using the augmented reality presentation device.

7. The augmented reality projection device of claim 1, wherein the directing of the projector to project the content includes selecting a particular lens from a plurality of different lenses included within the projector, the particular lens selected as a projection parameter that contributes to defining a field of view of the projector.

8. The augmented reality projection device of claim 1, wherein, as the projector projects the content onto the physical surface, the virtual target object is included, together with a portion of the physical surface onto which the content is projected, within the field of view of the image sensor.

9. A method comprising:
    determining, by an augmented reality projection device based on sensor output from a spatial sensor included within the augmented reality projection device, a location and orientation of the augmented reality projection device;
    determining, by the augmented reality projection device based on the determined location and orientation and based on a particular target object profile from a library of predetermined target object profiles, that a virtual target object associated with the particular target object profile is included within a field of view of an image sensor included within the augmented reality projection device;
    identifying, by the augmented reality projection device, content associated with the virtual target object; and
    projecting, by the augmented reality projection device using a projector included within the augmented reality projection device, the content onto a physical surface within a real-world environment, the physical surface associated with the virtual target object.

10. The method of claim 9, wherein the projecting of the content onto the physical surface is performed while the augmented reality projection device is physically detached from the physical surface.

11. The method of claim 9, further comprising:
directing, by the augmented reality projection device, the image sensor to capture an image of a portion of the real-world environment included within the field of view of the image sensor;
determining, by the augmented reality projection device based on the captured image, that a physical target object is included within the field of view of the sensor;
identifying, by the augmented reality projection device, additional content associated with the physical target object; and
directing, by the augmented reality projection device, the projector to project the additional content associated with the physical target object onto an additional physical surface within the real-world environment, the additional physical surface associated with the physical target object.

12. The method of claim 9, further comprising detecting, by the augmented reality projection device based on the sensor output from the spatial sensor, a change to the determined location and orientation of the augmented reality projection device; and
wherein the projecting of the content onto the physical surface includes dynamically stabilizing, in response to the detecting of the change to the determined location and orientation of the augmented reality projection device, the projection of the content at a particular portion of the physical surface.

13. The method of claim 9, further comprising including, by the augmented reality projection device, the particular target object profile in the library of predetermined target object profiles based on a designation, by a user of the augmented reality projection device, of the virtual target object for use as a makeshift screen.

14. The method of claim 9, further comprising including, by the augmented reality projection device, the particular target object profile in the library of predetermined target object profiles based on a designation, by a first user playing a virtual hide and seek game using the augmented reality presentation device, to hide the virtual target object in a location that is to be discovered by a second user playing the virtual hide and seek game using the augmented reality presentation device.

15. The method of claim 9, wherein the projecting of the content includes selecting a particular lens from a plurality of different lenses included within the projector, the particular lens selected as a projection parameter that contributes to defining a field of view of the projector.

16. The method of claim 9, wherein, as the projecting of the content onto the physical surface is performed, the virtual target object is included, together with a portion of the physical surface onto which the content is projected, within the field of view of the image sensor.

17. A non-transitory computer-readable medium storing instructions that, when executed, direct a processor of an augmented reality projection device to:
determine, based on sensor output from a spatial sensor included within the augmented reality projection device, a location and orientation of the augmented reality projection device;
determine, based on the determined location and orientation and based on a particular target object profile from a library of predetermined target object profiles, that a virtual target object associated with the particular target object profile is included within a field of view of an image sensor included within the augmented reality projection device;
identify content associated with the virtual target object; and
direct a projector included within the augmented reality projection device to project the content onto a physical surface within a real-world environment, the physical surface associated with the virtual target object.

18. The non-transitory computer-readable medium of claim 17, wherein the instructions further direct the processor to:
direct the image sensor to capture an image of a portion of the real-world environment included within the field of view of the image sensor;
determine, based on the captured image, that a physical target object is included within the field of view of the sensor;
identify additional content associated with the physical target object; and
direct the projector to project the additional content associated with the physical target object onto an additional physical surface within the real-world environment, the additional physical surface associated with the physical target object.

19. The non-transitory computer-readable medium of claim 17, wherein:
the instructions further direct the processor to detect, based on the sensor output from the spatial sensor, a change to the determined location and orientation of the augmented reality projection device; and
the directing of the projector to project the content onto the physical surface includes directing, in response to the detecting of the change to the determined location and orientation of the augmented reality projection device, the projector to dynamically stabilize the projection of the content at a particular portion of the physical surface.

20. The non-transitory computer-readable medium of claim 17, wherein the instructions further direct the processor to include the particular target object profile in the library of predetermined target object profiles based on a designation, by a user of the augmented reality projection device, of the virtual target object for use as a makeshift screen.

* * * * *